United States Patent [19]
Yevick

[11] 4,150,876
[45] Apr. 24, 1979

[54] LIGHT AMPLIFICATION DEVICE

[75] Inventor: George J. Yevick, Leonia, N.J.

[73] Assignee: Izon Corporation, Stamford, Conn.

[21] Appl. No.: 911,821

[22] Filed: Jun. 2, 1978

Related U.S. Application Data

[63] Continuation-in-part of Ser. No. 812,811, Jul. 5, 1977, , which is a continuation of Ser. No. 680,488, Apr. 26, 1976, abandoned.

[51] Int. Cl.$^2$ .............................................. G02F 1/13
[52] U.S. Cl. ..................................... 350/338; 350/342; 350/347; 350/357; 350/360; 250/213 R; 358/61; 358/62
[58] Field of Search ............... 350/338, 342, 347, 357, 350/360, 150; 96/1 R, 1 PC, 1.5; 250/213 R; 358/61, 62

[56] References Cited

U.S. PATENT DOCUMENTS

| | | | |
|---|---|---|---|
| 2,773,992 | 12/1956 | Ullery | 250/213 R |
| 2,909,667 | 10/1959 | Orthuber et al. | 250/213 R |
| 2,972,803 | 2/1961 | Koury et al. | 250/213 R X |
| 3,059,118 | 10/1962 | Koury | 250/213 R |
| 3,592,527 | 7/1971 | Conners et al. | 350/342 |
| 3,703,329 | 11/1972 | Castellano | 350/349 |
| 3,756,718 | 9/1973 | Letzer | 350/352 X |
| 3,840,695 | 10/1974 | Fischer | 350/345 X |

Primary Examiner—Edward S. Bauer
Attorney, Agent, or Firm—Thomas J. Greer, Jr.; Daniel M. Rosen

[57] ABSTRACT

A light amplification device displaying particular utility in the display of micro intelligence. In a known light amplifier construction employing transparent sheets between which an electric field is impressed, and which employs a photoconductive sheet and an electrically optically active sheet such as a liquid crystal sheet, a novel lattice member is inserted between the photoconductive sheet and the liquid crystal sheet. In one embodiment, the lattice is defined by a plurality of metallic studs mounted in a dielectric sheet. The studs localize the electric field impressed upon the liquid crystal sheet. The resultant display is a gravure display, the studs defining the gravure points. In several embodiments, the location and form of the gravure points are varied. Color displays are also made. The introduction of the lattice lowers the power requirements of the light amplifier.

34 Claims, 48 Drawing Figures

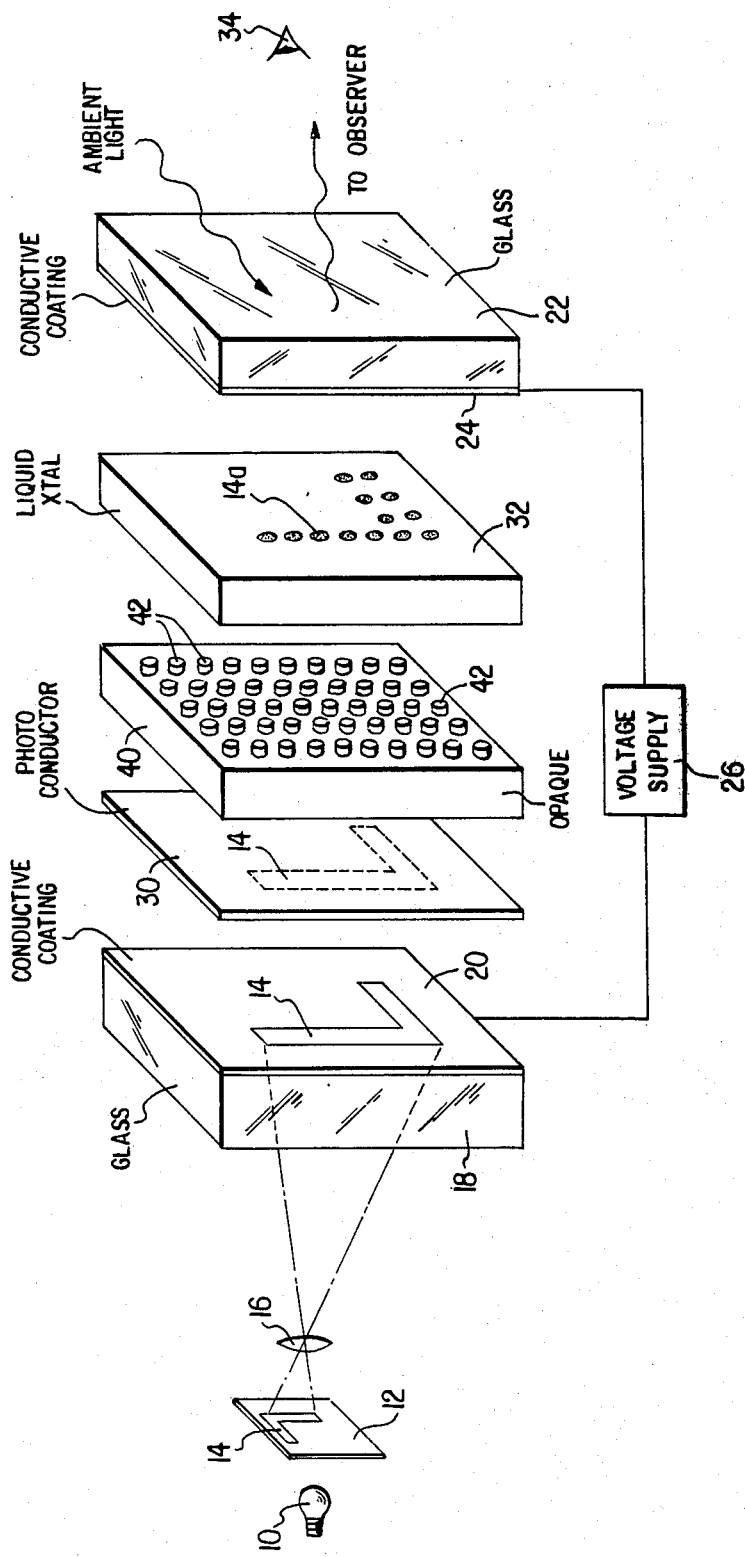

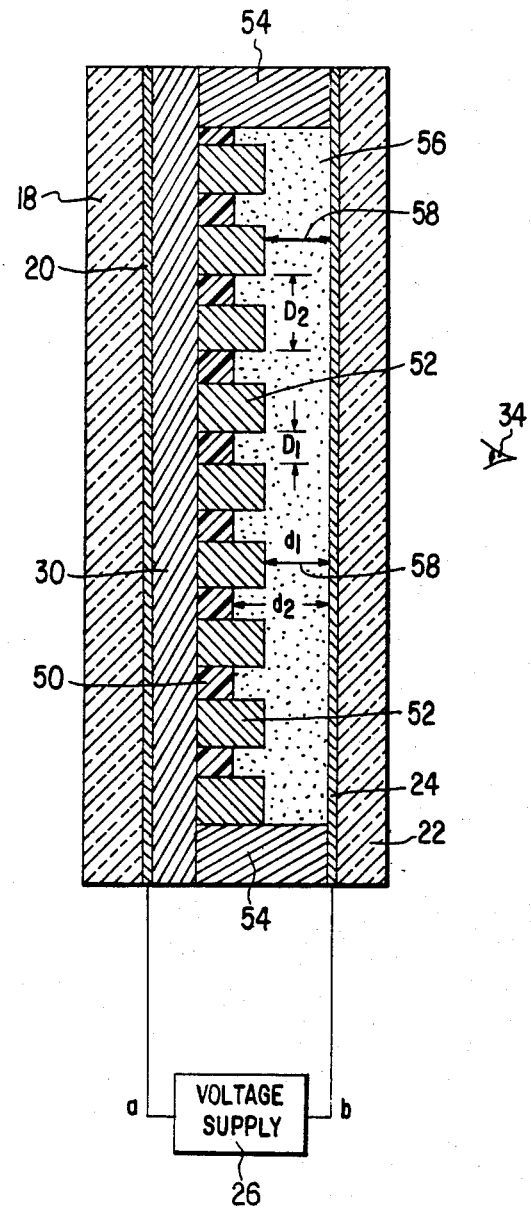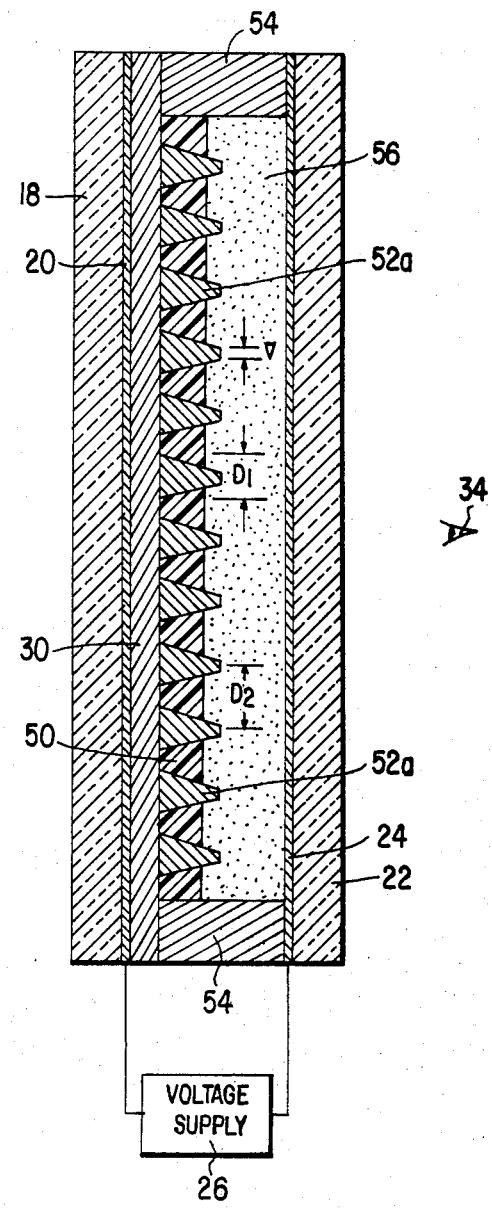

FIG. 6
FIG. 9
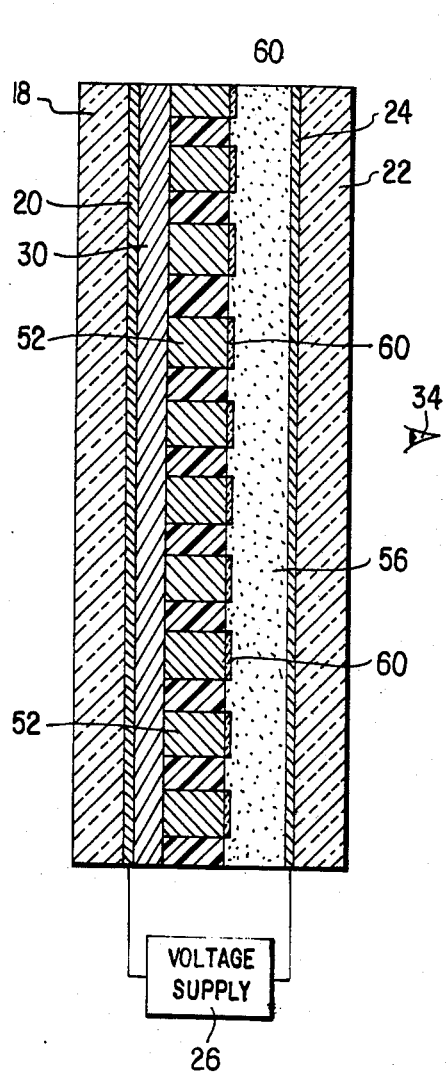
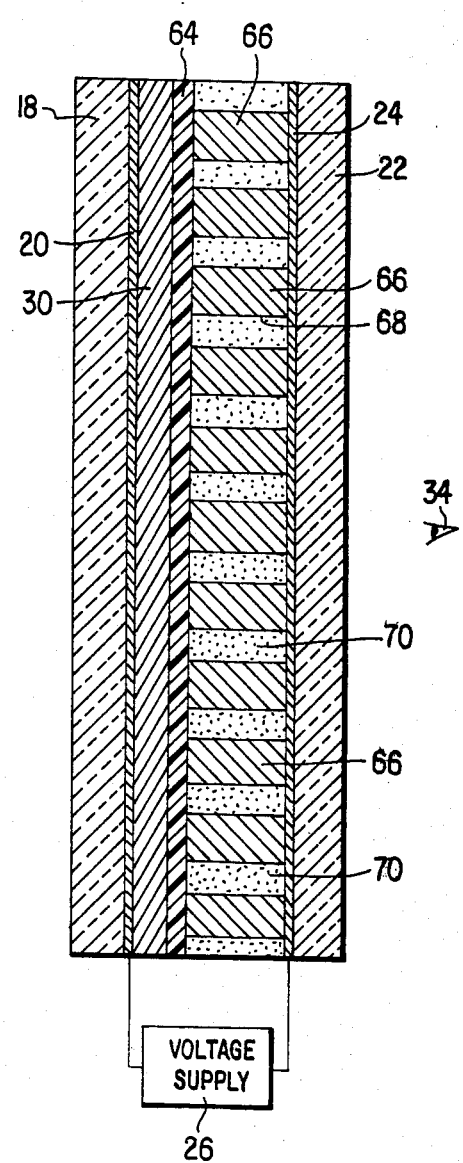

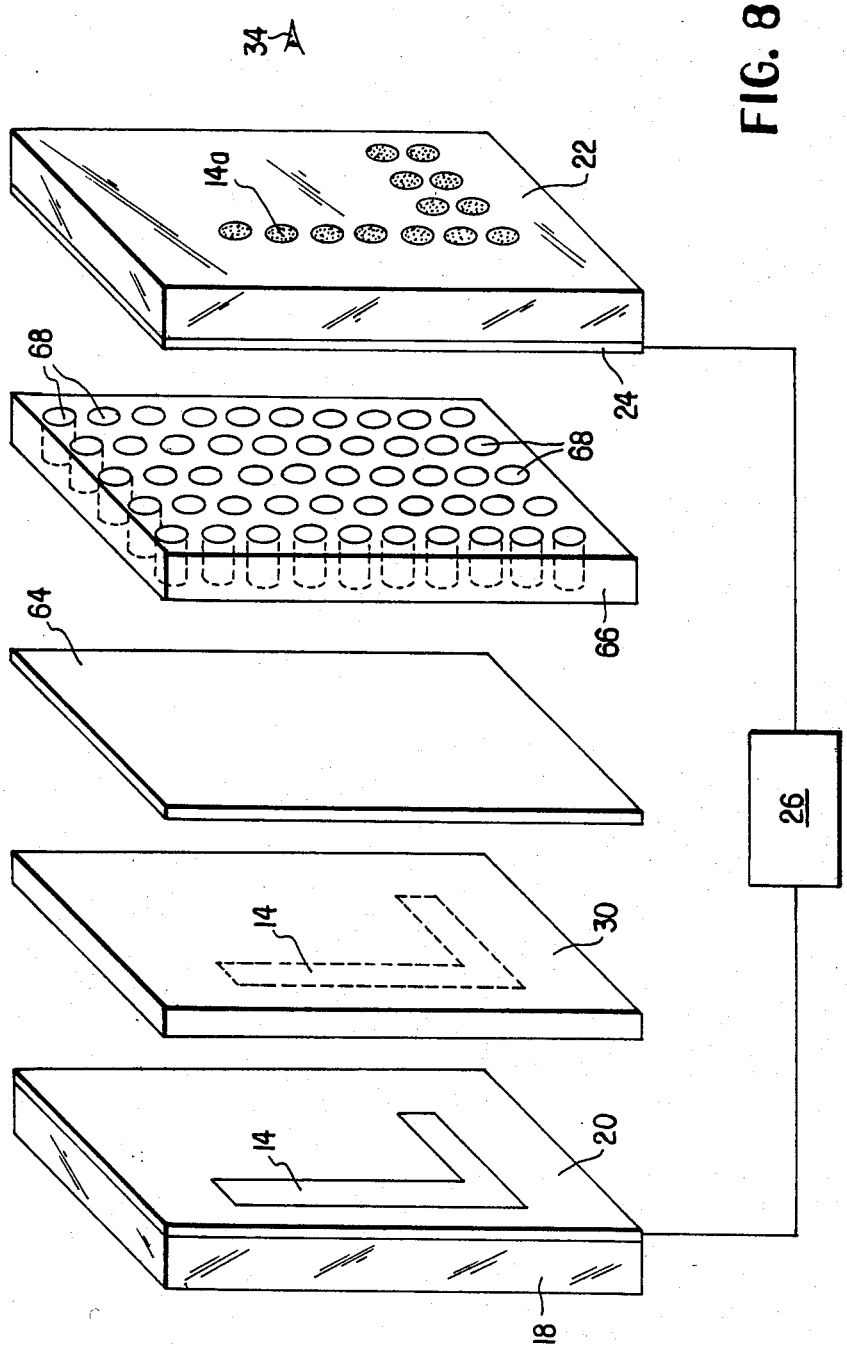

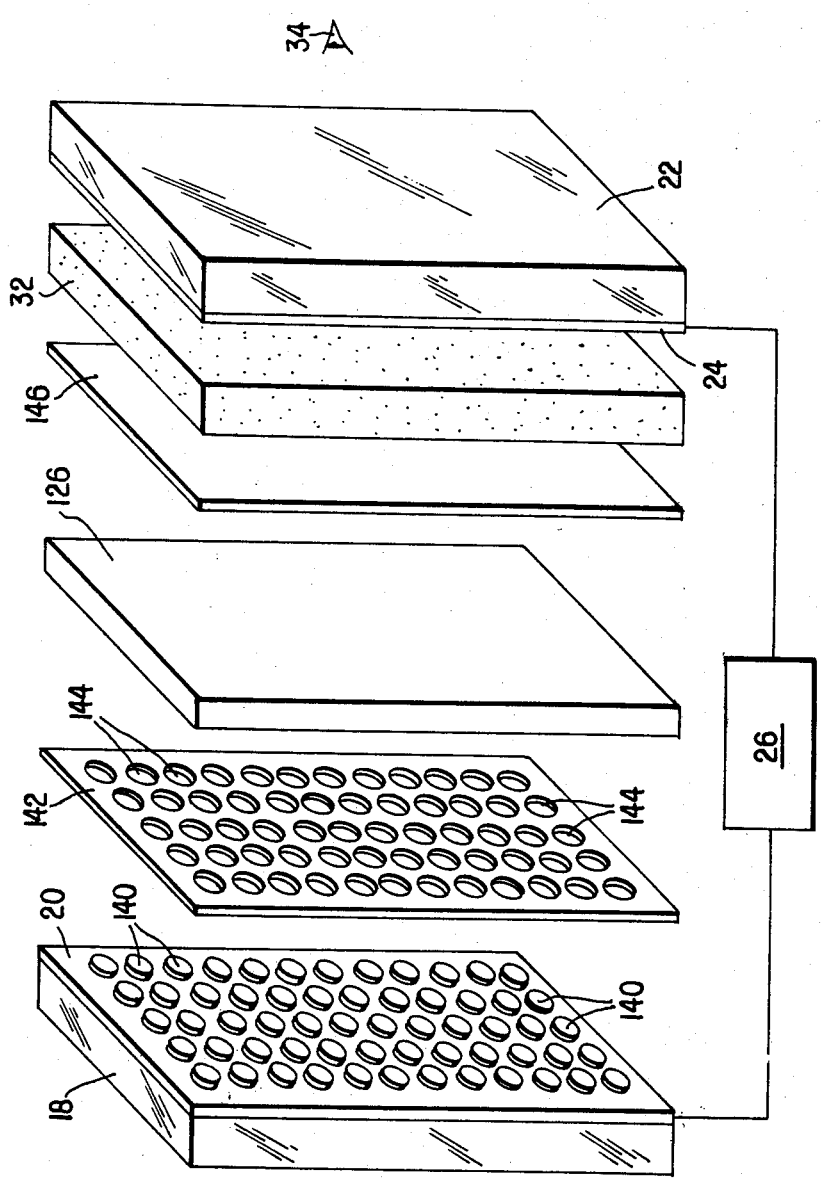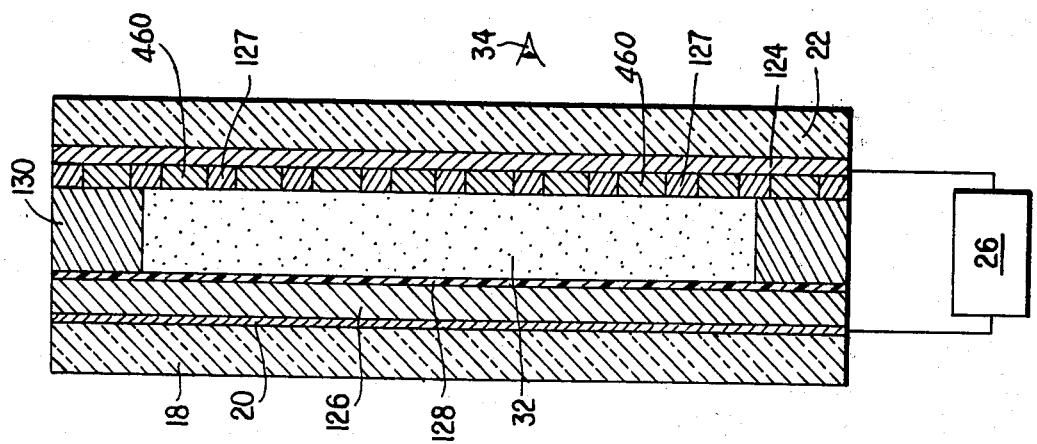

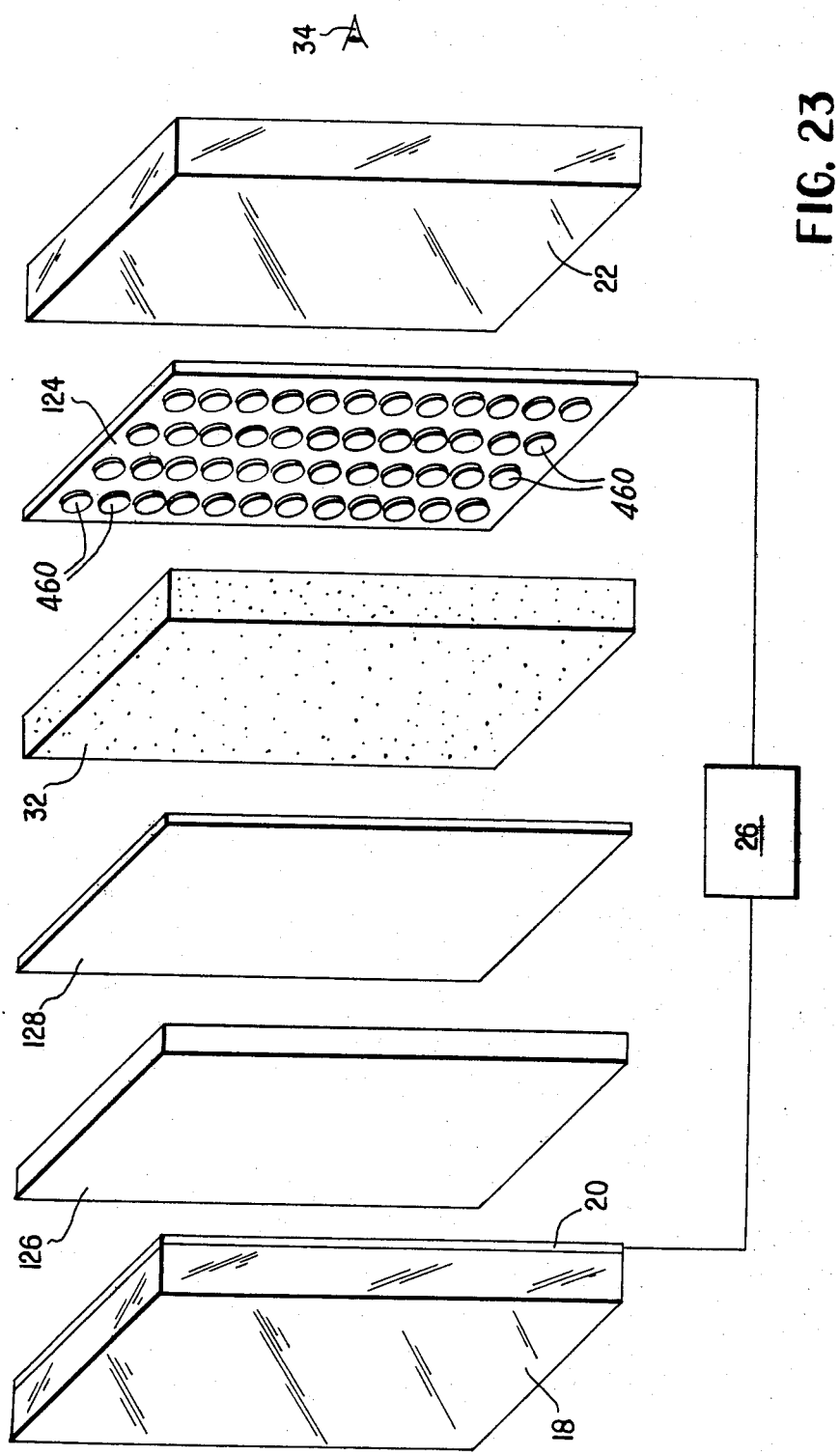

LIGHT AMPLIFICATION DEVICE

This is a continuation-in-part of my co-pending application Ser. No. 812,811, entitled Light Amplification Device which was filed on July 5, 1977 and is now abandoned and which was a continuation of application Ser. No. 680,488, filed on Apr. 26, 1976 and now abandoned.

This invention relates to an apparatus for the amplification of light and more particularly to an apparatus exhibiting utility in the display of micro intelligence. The art of storage of intelligence on a microfiche is known and has become increasingly attractive with the advent of certain micro intelligence devices such as those shown in my U.S. Pat. Nos. 3,824,609, 3,853,395, 3,864,034, 3,865,458, 3,903,531, and 3,944,350.

In apparatus for displaying micro intelligence, several arrangements or schemes for illuminating and projecting the stored micro information are known. All such methods ultimately employ a primary or basic source of illumination, such as an incandescent lamp bulb. In order for micro image readout devices to function inexpensively and reliably over long periods of time, it is obviously necessary to reduce as far as possible the power consumption of such a primary source of illumination. According to the practice of this invention, the power from such a primary source of illumination is reduced by the modification of a known system of light amplification.

In a typical prior art light amplification construction, a light amplifier is formed in the following manner. Each of a pair of transparent and parallel sheets is provided on its surface which faces the other with a transparent conductive coating. Between these two transparent sheets are sandwiched both a photoconductor sheet and an electro-optically active sheet, such as a liquid crystal sheet. A source of potential is connected between the two transparent, conductive coatings, and each of these four elements is placed together with the others to form a sandwich or laminate. In operation, light from an object passes through the first transparent sheet and onto its transparent conductive coating. This first conductive coating is adjacent the photoconductor sheet and those regions of the latter which are illuminated by light from the object undergo a lessening of electrical resistance. Such a decrease in electrical resistivity occurs at localized regions, the localized regions corresponding to the light from the object. In turn, the liquid crystal sheet is optically activated at those localized regions, corresponding to the adjacent localized regions of the photoconductor. The liquid crystal sheet thus now carries an image corresponding to the object, because the electric field between the two conductor coatings is now not uniform over the liquid crystal sheet. Lastly, ambient light impinging upon the second and endmost transparent sheet is modulated, so to speak, by the liquid crystal sheet, with the result that the viewer sees an image of the object.

Such prior art constructions are described in the following publications. It is to be understood that this prior art is not intended to be exhaustive and is intended to set out the typical prior art. U.S. Pat. No. 3,842,002, issued to Bear; U.S. Pat. No. 3,732,429, issued to Braunstein et al; U.S. Pat. No. 3,708,220, issued to Meyers et al; U.S. Pat. No. 3,840,288, issued to Schnatterly; U.S. Pat. No. 3,803,408, issued to Assouline et al; and U.S. Pat. No. 3,840,286, issued to Kiss, U.S. Pat. No. Re. 16,733, issued to Jenks, and U.S. Pat. No. 3,313, issued to Zarombe. Additionally, the following literature publications are to be noted. *Performance Characteristics of Electrochromic Displays*, IEEE Transactions on Electron Optics, Vol. ET-22, No. 9, September 1975, by Chang and Howard; *Twisted Nematic Display With Cholsteric Reflector*, by Scheffer in J. Phys. D. Appl. Phys. Vol. 8, 1975.

While the prior art light amplification arrangement previously described operates in a satisfactory manner, greater economies of power and control of quality are realized by the practice of this invention. More particularly, the amount of light emanating from the object, in order to be seen in the display sheet, is reduced. This in turn enables one to employ a smaller source of illumination with consequent economies in power.

The invention resides in the recognition that the technology of gravure printing may be employed with such a light amplifier. According to the invention, a gravure lattice is placed between and sandwiched by the photoconductor sheet and the liquid crystal sheet, in the prior art apparatus. The individual points of the gravure lattice are defined in a typical embodiment by metallic studs embedded in an insulator. The function of the studs is to localize and intensify the electric field which acts on the liquid crystal. As is well known in the gravure printing art, the human eye cannot distinguish between two points which are less than a certain distance apart. The present invention makes use of this behavior of the human eye in effectively subtracting from the prior art produced image a quantity of (light) information which is not necessary. As in the gravure art, the present invention relies upon the fact that visual information may be discontinuous, as opposed to continuous.

The form of the gravure lattice points may vary. Thus, instead of metal studs, the lattice points may be defined by cavities in a dielectric sheet, the cavities filled with an optically active medium. The optically active medium may be liquid crystals (LC), electrochromic ions (EC), electrophoretic particles (EP), or ferroelectrics (FE). Alternatively, the lattice points may be defined by a discontinuous photoconductor ensemble. The gravure technique of this invention is also employed in a novel class of light amplifiers for amplifying light to yield color images.

IN THE DRAWINGS

FIG. 1 is a partially schematic view of a light amplifier according to the practice of this invention.

FIG. 2 is a partially schematic cross-sectional view of a light amplifier of the type shown at FIG. 1.

FIG. 3 is a view similar to FIG. 2, and illustrates an embodiment wherein certain metallic studs are narrowed at their ends.

FIG. 6 is a view similar to FIG. 2, and illustrates an embodiment which employs a reflective mode of operation.

FIG. 8 is an embodiment in which a dielectric medium is provided with a plurality of cavities.

FIG. 9 is a partially schematic, cross-sectional view of the light amplifier shown at FIG. 8.

FIG. 22 is a partially schematic, cross-sectional view of another embodiment of the invention.

FIG. 23 is a partially schematic perspective view of a light amplifier of the type shown at FIG. 22.

FIG. 25 is a partially schematic perspective view and illustrates still another embodiment of a light amplifier.

FIG. 45 is a view similar to FIG. 44 and illustrates still another embodiment, here employing two polarizers and a nematic liquid crystal there between.

Figure 4:
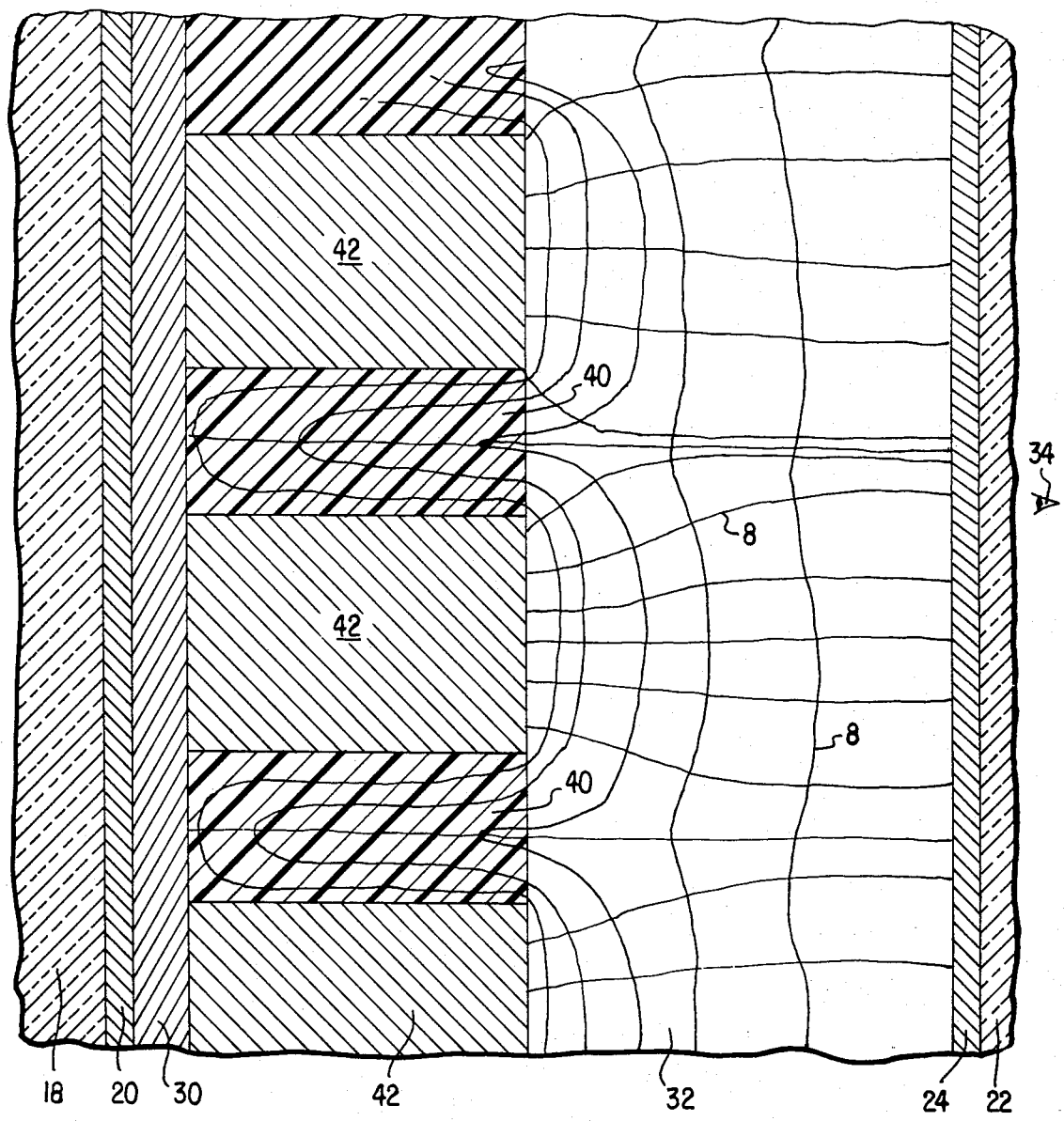
FIG. 4 is a partially schematic cross-sectional view of a typical light amplifier according to this invention and illustrates the configuration of a static electric field for one form of gravure lattice array.

Referring now to FIG. 1 of the drawings, the numeral 10 denotes generally a source of illumination such as a common incandenscent light. The numeral 12 denotes generally a transparent carrier of information here illustrated as carrying the letter L denoted by the numeral 14. The carrier 12 may assume a wide variety of forms. For example, it may assume the form of a microfiche and the information denoted by the numeral 14 then assuming the form of micro-images thereon. The numeral 16 denotes a lens and is intended to embrace any lens system such as a plurality of lens elements on a microfiche readout device. The numeral 18 denotes a first transparent sheet, formed of glass or plastic, and coated on one side with a transparent and electrically conductive coating 20. The numeral 22 denotes a second and similar transparent sheet also provided on one of its surfaces with a transparent, electrically conductive coating 24. The numeral 26 denotes a source of potential for establishing an electric field between spaced conductive coatings 20 and 24. The numeral 30 denotes a sheet of a photoconductor. Many photoconductor materials may be used, such compounds as cadmium sulfide, zinc sulfide amorphous or non-crystaline selenium are among those materials which may be used. The property of the photoconductor material defining sheet 30 is such that its electrical resistance is high in the absence of illumination and significantly decreases when exposed to light. The numeral 32 denotes a sheet or block which may be of a liquid crystal or of a ferroelectric material, or any material such that its optical properties change when subject to an electrical field.

The elements thus far described are known in the art and function in the following manner as a light amplifier. The elements 18, 30, 32, and 22 are sandwiched together in the same order illustrated at FIG. 1. With no light falling upon transparent sheet 18, there will be no localized changes in the optical activity of liquid crystal sheet 32 and accordingly the viewer, whose eye is schematically indicated by the numeral 34, will observe no information through sheet 22. If now, light falls in a non-uniform manner on transparent sheet 18, such as indicated at FIG. 1 by the letter L, the regions of photoconductor sheet 30 which are illuminated by light from the object 14 will markedly decrease in electrical resistance. The electric field maintained by source 26 will accordingly act non-uniformly on electrically optically active sheet 32, with the result that the observer 34 will see the letter L on sheet 22. All portions within the outline of the letter L will be of the same intensity and texture, while all portions exterior of the outline of the letter L will also be of the same intensity and texture, different from the former however.

According to the practice of this invention, a new element is added to this known arrangement, the new element decreases the power requirements and further improves other performance aspects of the light amplifier. The new element is an electrode lattice defined by a dielectric sheet 40 in which are embedded a usually regular array of metallic studs 42. The metallic studs 42 extend completely through the dielectric member 40. The operation of the device with dielectric member 40 is essentially the same as previously described, with, however, the following important difference. As before, the letter L (or other information) is projected onto transparent sheet 18 and passes through transparent conductive coating 20. It then falls on sheet 30 as indicated by the dashed numeral 14. The strength of the electric field between the coatings 20 and 24 within the dashed lines 14 locally increases because the electrical resistivity of sheet 30 at the area within the dashed outlines of the letter L decreases. However, this locally increased electric field does not act uniformly on electrically optically active member 32. The reason is quite simple. There is no drop or loss in electric potential between the ends of the metallic studs 42. Accordingly, at those regions of member 32 which are immediately adjacent each of the studs 42, the electric field acts to change the optical activity of the member. However, the local change in local potential is not transmitted by the dielectric material 40 and accordingly negligible electric field acts on member 32 in the regions thereof corresponding to the inter-stud regions of member 40. The result is schematically indicated by the numeral 14a at FIG. 1 wherein the original letter L appears in the form of locally energized areas corresponding to certain of the studs 42. The observer at 34 now sees, instead of the continuous letter L, what is effectively a gravure printed letter L. The reader will now be in a position to immediately grasp the energy saving made possible by this invention. The observer at 34 sees the letter L as though the entire surface of the letter appeared on the face of member 32. In reality, however, less than this area is defined because the combined area of the ends of studs 42 within the finally projected letter L, denoted by the numeral 14a, is less than the entire area within the letter L denoted by the numeral 14 on either sheet 18 or photoconductor 30.

The ligh from lamp 10 acts only as a trigger for activating the visual display seen by observer 34 at the right transparent sheet 22. The light utilized by the observer is ambient light. A most significant aspect of the invention is that the brighter the ambient light, the brighter will be the image seen by the observer. This is unlike active display devices, such as LED or plasma display panels, wherein image brightness can only increase with the expenditure of additional electrical energy. The reader will also understand that those ends of studs 42 which face sheet 22 may be shiny in the case the device is operated in a reflective mode.

The spacing between studs 42 may vary within certain limits depending upon the distance of the observer from screen 22. For practical purposes, the Rayleigh criterion for the human eye prevails. A very good human eye can perceive an angular displacement of two point light sources of about 1/3000th radian. This would yield an inter-stud spacing of about 3.3 mils for normal reading distance. Most fine screens in the art of gravure printing have interpoint spacings of about 7 mils. For a viewing distance of about 10 inches, the inter-stud spacing may be 10 mils. Hence, a typical set of parameters is an inter-stud spacing about 7 mils for a viewing distance of about 10 inches.

Referring now to FIG. 2 of the drawings, a typical cross-section of a somewhat modified device of the type shown at FIG. 1 appears. In this embodiment, the dielectric sheet is denoted by the numeral 50 and carries metal studs 52 which project beyond the right hand surface of sheet 50. The numeral 54 denotes a spacer element extending around the entire periphery of the transparent sheet 22, the spacer and the interior of sheet 22 defining a space 56 which receives, for example, a liquid crystal or an electrolyte or an electrophoretic solution. Whatever material is place in cavity 56 is electrically optically active. The numeral 58 denotes a typical spacing between the projecting ends of metal studs 52 and transparent sheet 22. The mode of operation is the same as that previously described. The reader will observe that relatively high electric fields are established at the regions 58 between the ends of the metal studs and coating 24.

Referring now to FIG. 3 of the drawings, an embodiment is shown which is similar to that of FIG. 2, except that the metal studs are in the form of truncated cones and they bear the designation 52a. Because the area of the tip of the studs has been reduced, even higher electric fields between the tips and coating 24 are established and still greater optical contrast thereby enjoyed by observer 34.

Referring now to FIG. 4 of the drawings, the curved lines 8 represent the static electric field configuration for the case wherein the lattice member contains metal studs 42 which are of the same height as the thickness of the opaque, dielectric member 40 in which they are mounted and carried.

Figure 5:
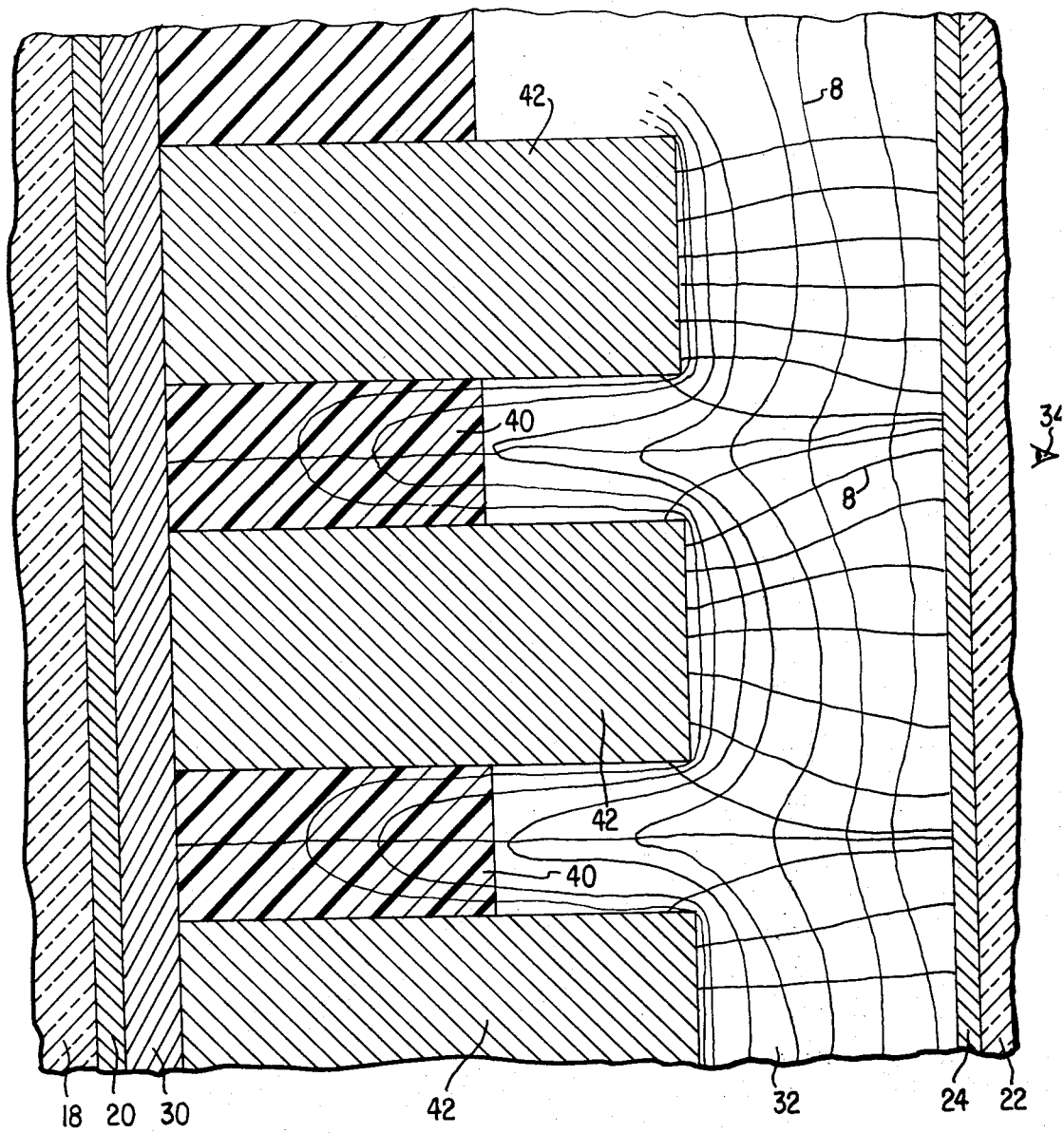
FIG. 5 is a view similar to FIG. 4, and illustrates another static electric field configuration for another gravure lattice array.

FIG. 5 is a view similar to FIG. 4 and illustrates the static electric field configuration for the case wherein the metallic studs are of a height greater than the thickness of the opaque, dielectric member which carries them.

Referring now to FIG. 6 of the drawings, another cross-section, partially schematic, of an apparatus of the type shown at FIG. 1 is given. The construction is the same as that previously described with respect to FIG. 2 with the addition of mirrored surfaces 60 on those ends of metal stud members 52 which face the sheet 22.

Figure 7:
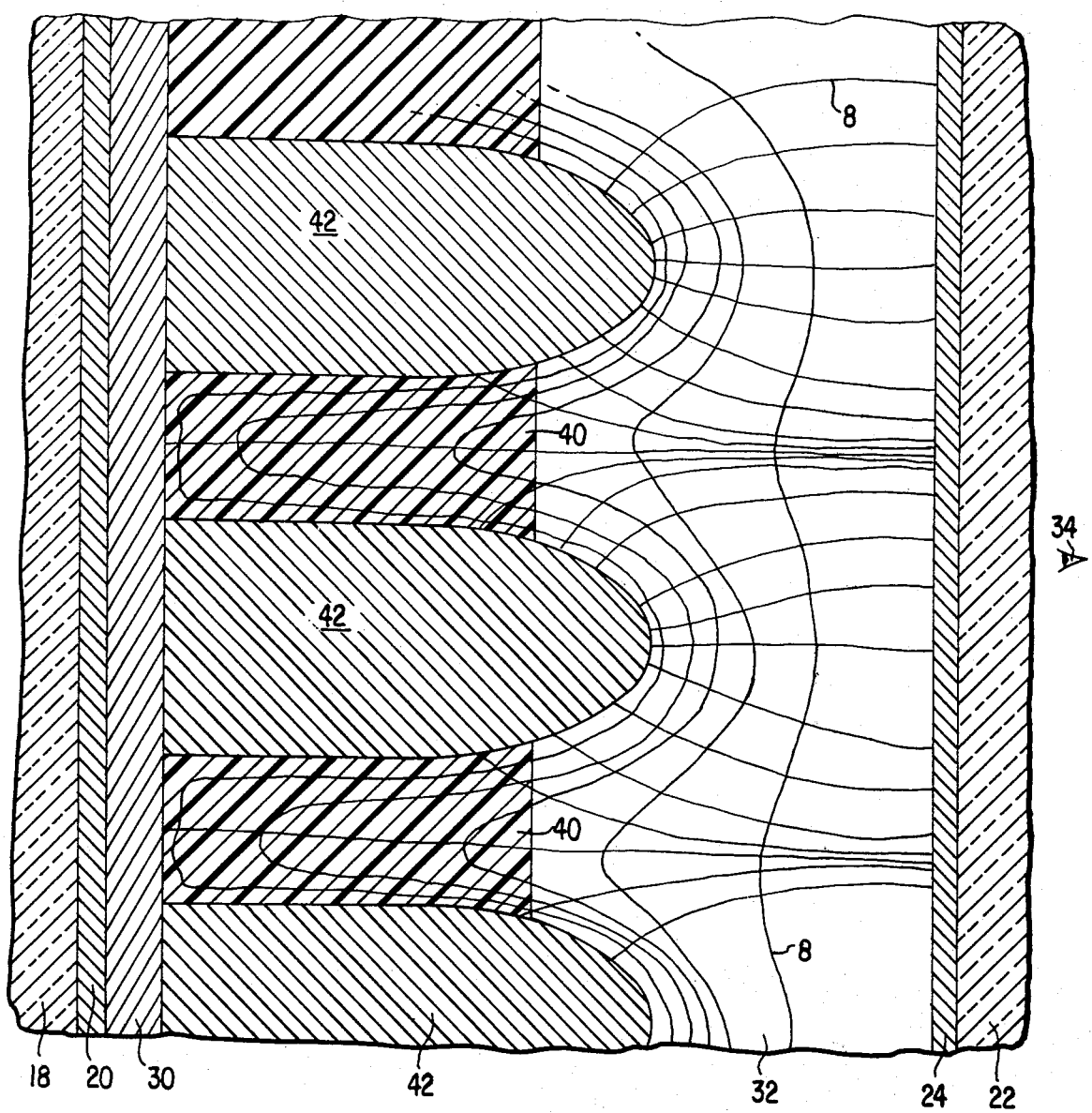
FIG. 7 is a view similar to FIG. 5, and illustrates still another embodiment of a light amplifier.

FIG. 7 is a view similar to FIG. 5 and shows another modification of the metal stud electrodes embedded in the insulator sheet 40. Here, the tips of the metal studs 42 which project towards the sheet 22 are rounded.

Referring now to FIGS. 8 and 9 of the drawings, a modification is illustrated wherein the same gravure effect is realized, but without the use of metallic studs to define the gravure points or dots. Instead, a dielectric medium is provided with a plurality of cavities with each cavity containing a quantity of an appropriate optically active material of the same type previously employed. Thus, the function of the metallic studs in defining the gravure points is now assumed and carried out by discrete, individual volumes of electrically optically active material. At FIGS. 8 and 9, the lattice member and the continuous sheet of optically active material have been effectively replaced by a single dielectric block or sheet which carries cavities filled with the liquid crystal or similar material. The numeral 64 denotes an opaque dielectric sheet which abuts the left face of opaque dielectric sheet 66, the latter carrying a plurality of cavities 68. Each cavity is filled with an electrically optically active material 70, such as a liquid crystal. Assume now the same projection of the letter L in FIG. 8 as was shown at FIG. 1. The photoconductive sheet 30 will again contain regions of much lower electrical resistivity where the light is incident thereon. This lower region of electrical resistivity, in the general form of the letter L, is adjacent to those cavities 68 of dielectric member 66 which are optically aligned with the outlines of the letter L. The increased electric field at these cavities 68 results in a change in optical activity of the material 70 therein and accordingly the observer 34 sees a gravure presentation of the letter L, again as denoted by the numeral 14a. One important advantage of the embodiment shown at FIGS. 8 and 9 concerns the tendency of certain optically active materials, such as electrophoretic particles, to settle under the influence of gravity. In the case of a relatively large cavity containing such a material, the settling of certain particles in the liquid crystal deleteriously affects operation. In the case of the small cavities 68, however, even though settling will occur, because they are distributed over the entire area of sheet 22 any vertical change in optical activity, in any one of them, will still yield a gravure presentation which is locally uniform over the entire extent of the relatively large sheet 22. Another advantage of the distributed cell arrangement is that optical cross talk between adjacent 68 is precluded. Also, the use of distributed cells permits different electro-optic media to be placed in adjacent cells.

If the light amplifying display device is operating in the reflective mode, the layer between the photoconductor 30 and the electro-optic lattice array 66 is a dielectric mirror. The construction and properties of such mirrors is well known. It is important that ambient light not reach the photoconductor 30, otherwise it would destroy its amplifying capability. In the event that the dielectric mirror is not sufficient to keep ambient light from impinging upon the photoconductor 30, a very thin opaque dielectric coating between the dielectric mirror and the photoconductor 30 may be utilized. Other possible coatings or layers between the photoconductor 30 and the electric-optic lattice array 66 are opaque white scatterers and opaque black absorbers.

Opaque color absorbers may also be used to set off or contract the changes effected by electric fields in the electro-optic domains or regions 68. Again, the effect of the lattice array is to prevent diffusion, thereby sharpening the quality of the image to the maximum capability of the eye. The lattice 66 also increases the response time of the display.

Figure 10:
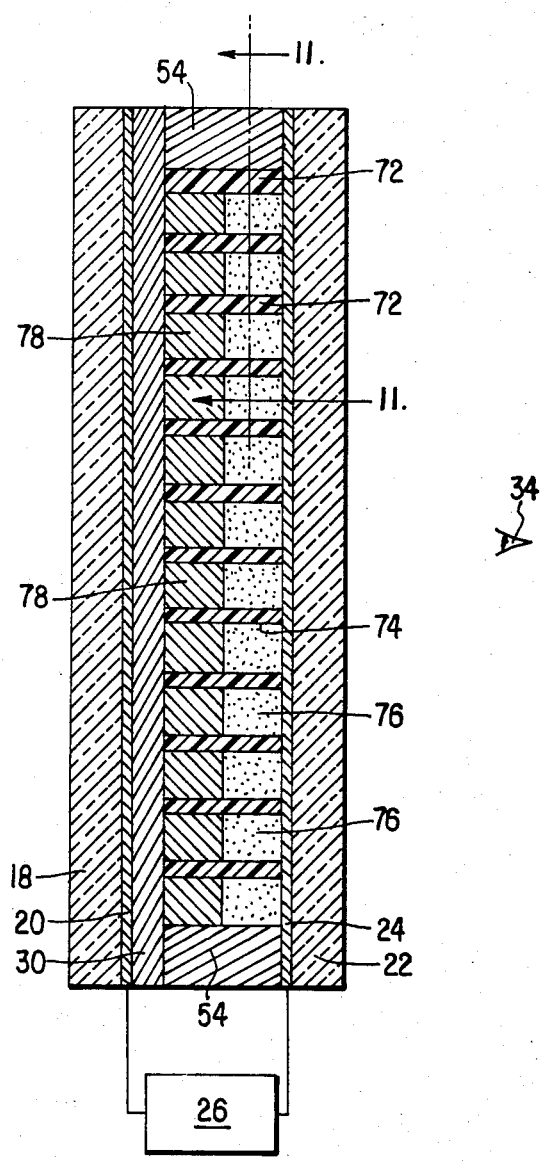
FIG. 10 is a partially schematic, cross-sectional view of still another embodiment of the invention.
Figure 11:
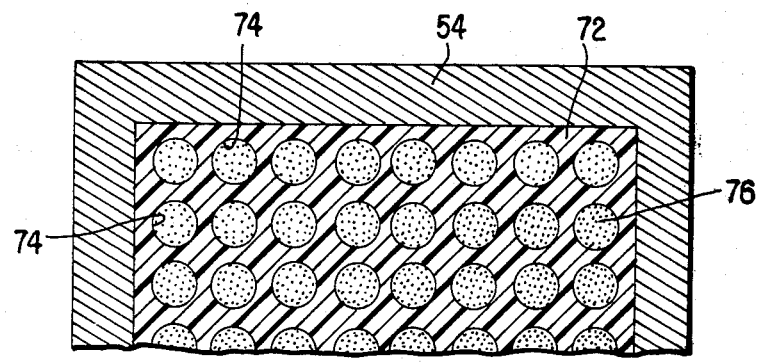
FIG. 11 is a view taken along section 11—11 of FIG. 10.
Figure 12:
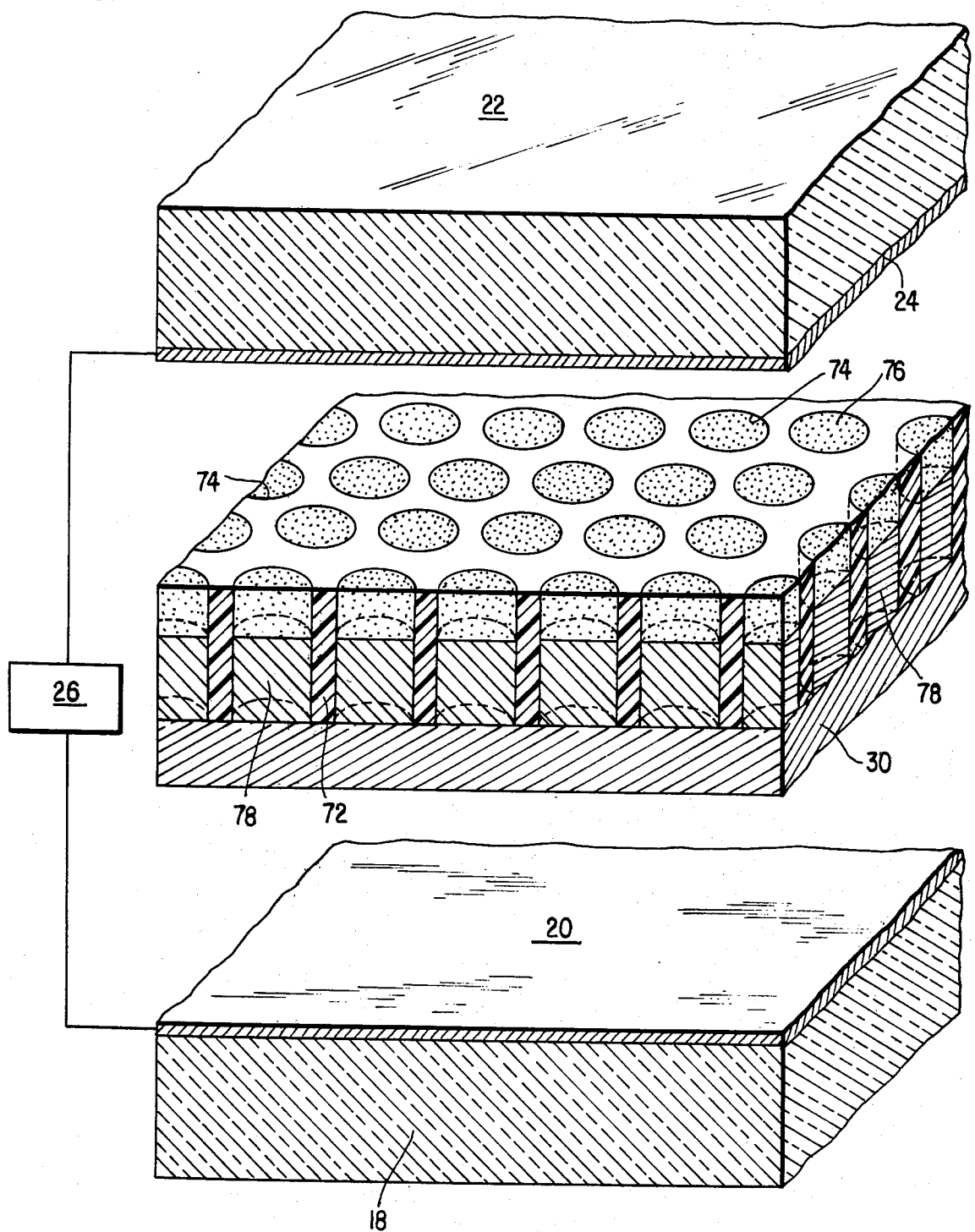
FIG. 12 is a partially schematic perspective view of the embodiment shown at FIG. 10.
Figure 13:
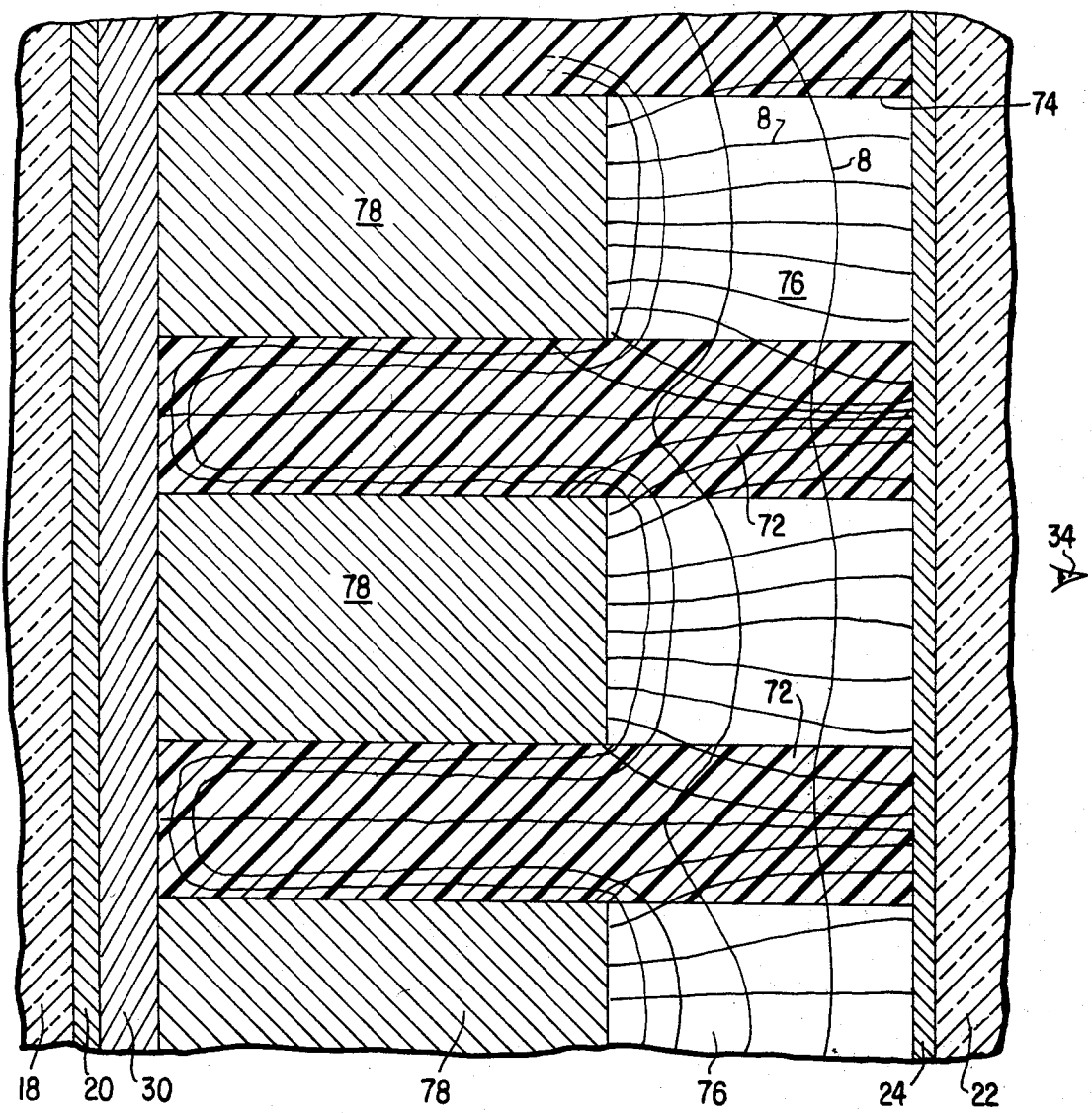
FIG. 13 illustrates the configuration of the electrostatic field for the construction of FIGS. 10–12.

Referring now to FIGS. 10-12 of the drawings another modification is illustrated, here one which employs the metallic studs as well as the individual cavities or domains 76 of a electro-optically active material, such as a liquid crystal or electrochromic ions. Again, the numeral 54 denotes a continuous spacer around the periphery of the apparatus. As seen at FIGS. 10 and 12, one boundary of the cavities 74 is defined by the forward ends of the metallic studs 78. The mode of operation of the embodiment is evident. FIG. 13 illustrates static electric field configuration for this embodiment.

Figure 14:
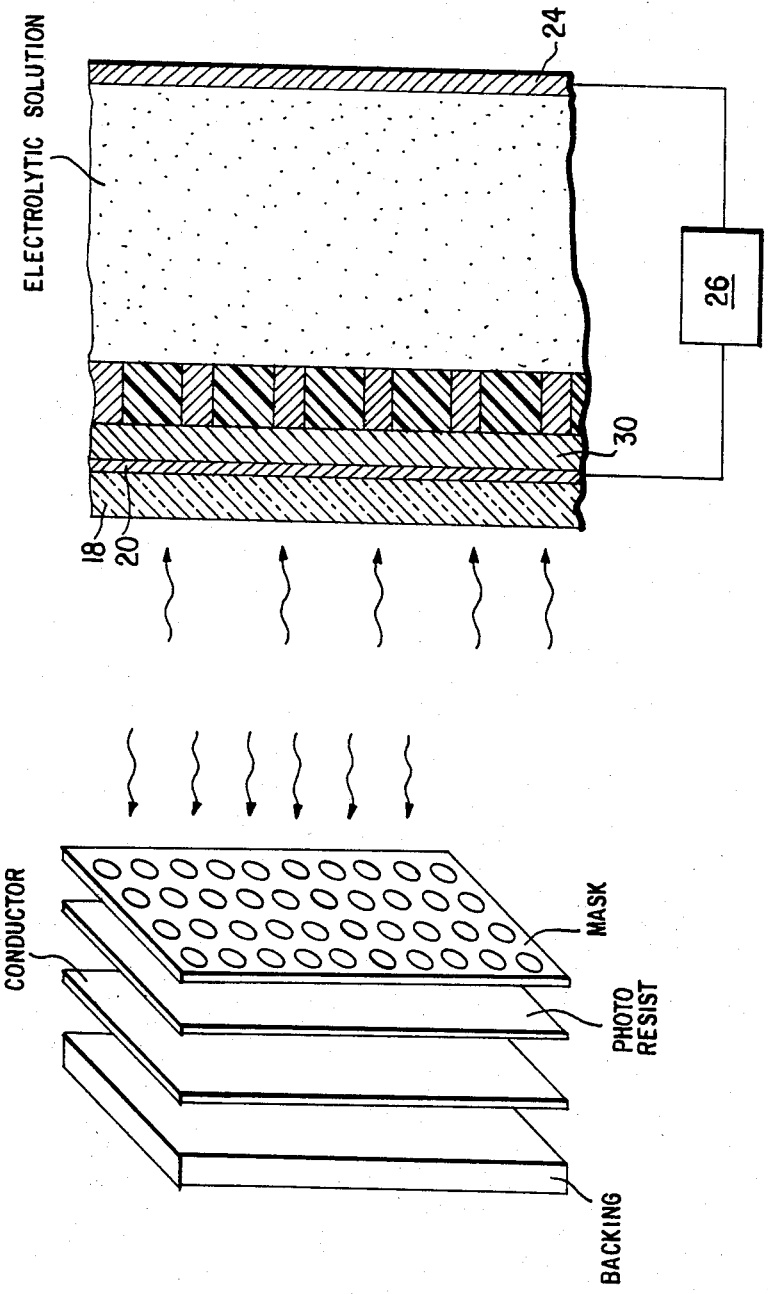
FIG. 14a illustrates one method of fabricating a gravure lattice array.
FIG. 14b illustrates another method for forming a gravure lattice array.

Referring now to FIG. 14a, one method of constructing a conducting lattice is illustrated. Light passes through a mask which is provided with properly sized black circles, such masks being readily available from the printing trades. The light falls onto a photoresist. By processing the photoresist in the regions where the light fell, the photoresist is removed and etching through the metal underneath may be accurately carried out. A sub-stratum supports the metallic cylinders. An inert, high-resistance opaque dielectric can now be formed in the interstices of the culinders. One such method is to pack very fine ceramic grit and then to fire the ensemble. Another method applicable for some electro-optic media is to pour epoxy cement. If the sub-stratum consists of NESA glass and photoconductor layer, the light amplifier device is very nearly completed. The addition of an electro-optic medium and NESA glass completes one form of light amplifier.

At FIG. 14b, another method of forming a conductive lattice is illustrated. There, the glass-conductor-photoconductor sandwich is coated with a photoresist and ultraviolet light directed, as indicated, through a mask containing a circular distribution. Where the radiation passes through the holes, the photoresist is removed. One can now electrolytically deposit metal on the photoconductor with light from the rear providing the necessary carriers. Still a third method not illustrated is to sputter onto the photoconductor (through a mask) a conductor lattice array. This third method is particularly appropriate for thin conductors.

Figure 15:
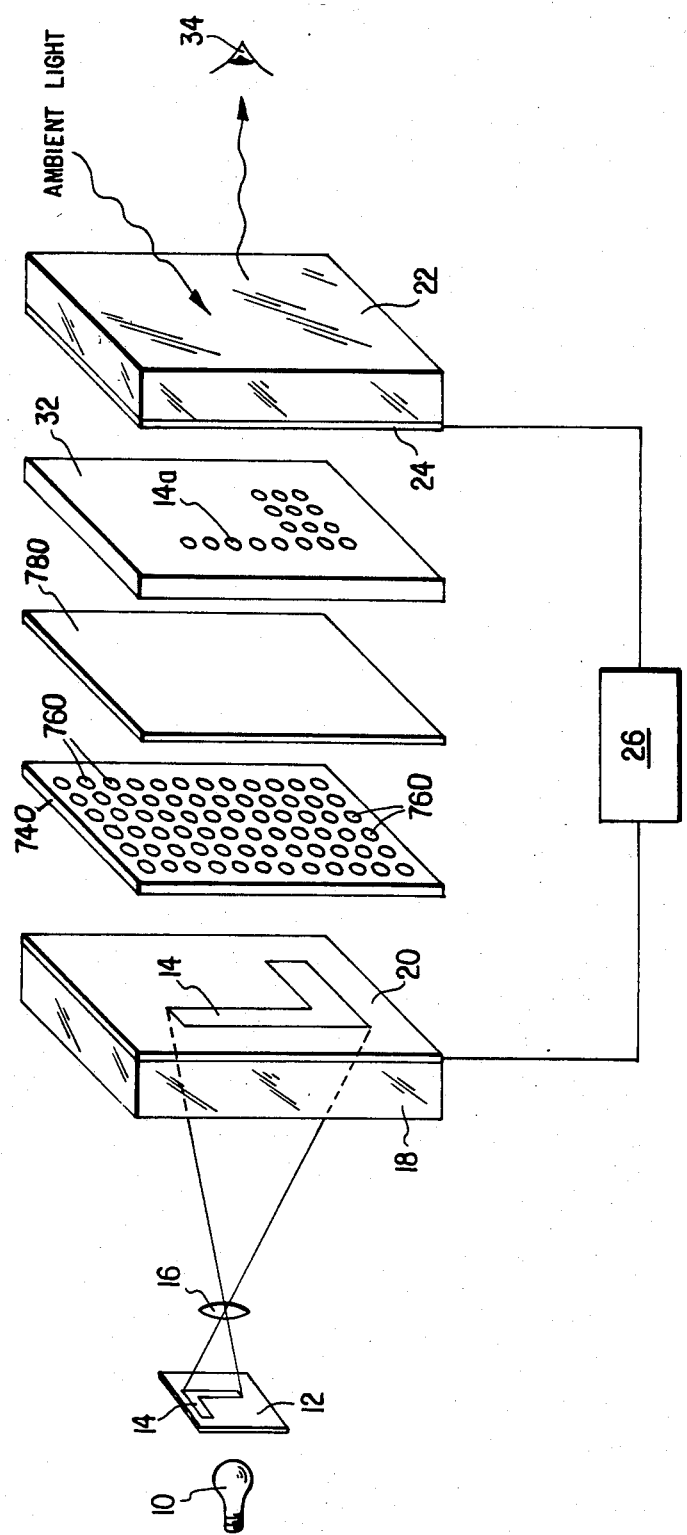
FIG. 15 is a view similar to FIG. 1 and illustrates still another embodiment of a light amplifier according to this invention.
Figures 16, 18:
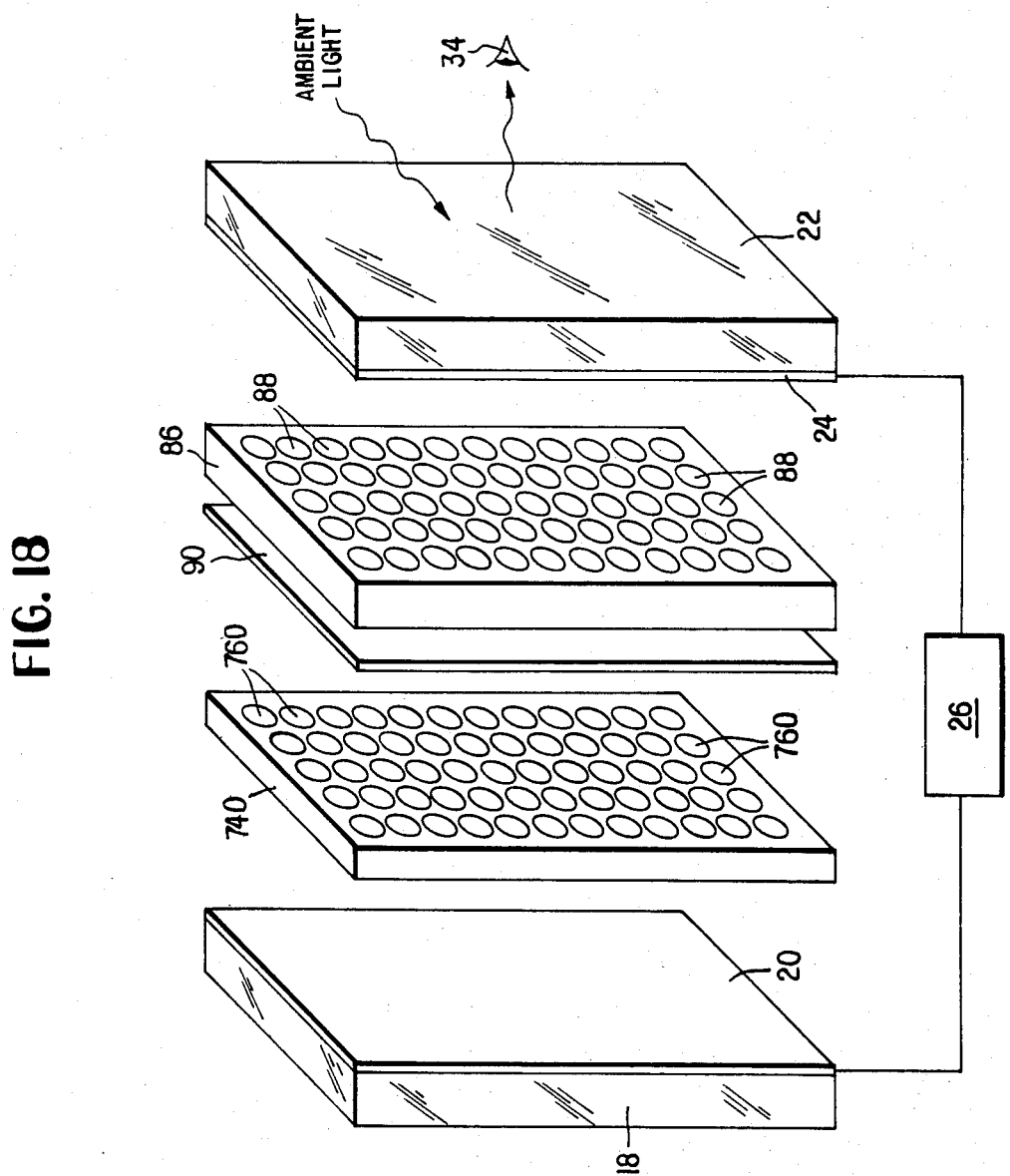
FIG. 16 is a partially shcematic, cross-sectional view of the light amplifier shown at FIG. 15.
FIG. 18 is a view similar to FIG. 17 and illustrates another embodiment.

Referring now to FIGS. 15 and 16, another embodiment is illustrated. This embodiment is similar to those previously described with the main exception of elements 740 and 780. The numeral 740 denotes an opaque dielectric having a plurality of aperatures in which are embedded photoconductive plugs 760. The numeral 780 denotes a relatively thin and opaque dielectric layer. The mode of operation of this embodiment will be apparent. Light from the object L impinges upon transparent sheet 18 and conductive coating 20, as indicated. At those regions adjacent and within the outline of the letter L, the photoconductive plugs 760 will undergo a marked decrease in electrical resistivity. This in turn will cause an increase in the electric field through electrically optically active element 32, such as a liquid crystal, with the result that at localized regions 14a thereof (the gravure points) the letter L will appear. As before, the display 14a acts in combination with ambient light to yield the object as seen by observer 34. The function of opaque dielectric sheet 780 is to preclude ambient light from striking photoconductive elements 760.

Figure 17:
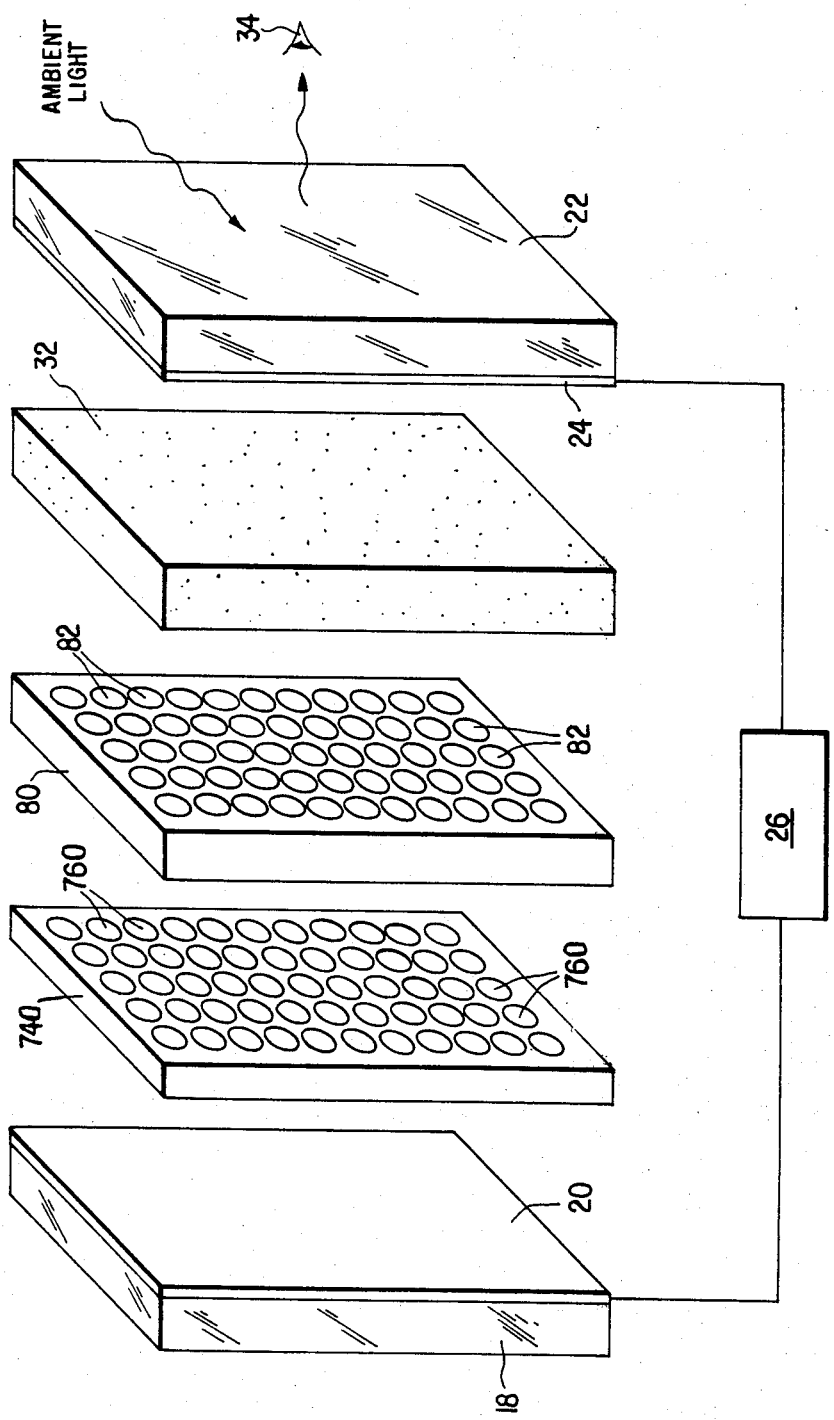
FIG. 17 is a partially schematic perspective view illustrating still another embodiment of a light amplifier according to this invention and wherein cross-talk is minimized.

FIG. 17 shows another embodiment, similar to that of FIG. 15, wherein the opaque dielectric sheet 780 of the embodiment of FIG. 15 has been replaced by member 80. Member 80 is a dielectric sheet carrying a plurality of metallic studs denoted by the numeral 82. Each metal stud 82 is optically aligned with a photoconductive element 760 in opaque dielectric sheet 740. An advantage of the construction shown at FIG. 17 is that cross talk is substantially eliminated.

Referring now to FIG. 18, another embodiment is illustrated and is similar to the embodiments of both FIGS. 15 and 17. The numeral 740, as previously described, denotes a dielectric panel or sheet which includes a plurality of apertures having photoconductive elements 760 therein the photoconductive elements extending completely through the dielectric sheet 740.

The numeral 86 denotes a dielectric sheet or plate having a plurality of apertures each of which carries an electro-optic medium denoted by the numeral 88. The numeral 90 denotes an opaque dielectric sheet which effectively precludes ambient light or other electromagnetic radiation from striking the righthand face of sheet 740.

Figure 19:
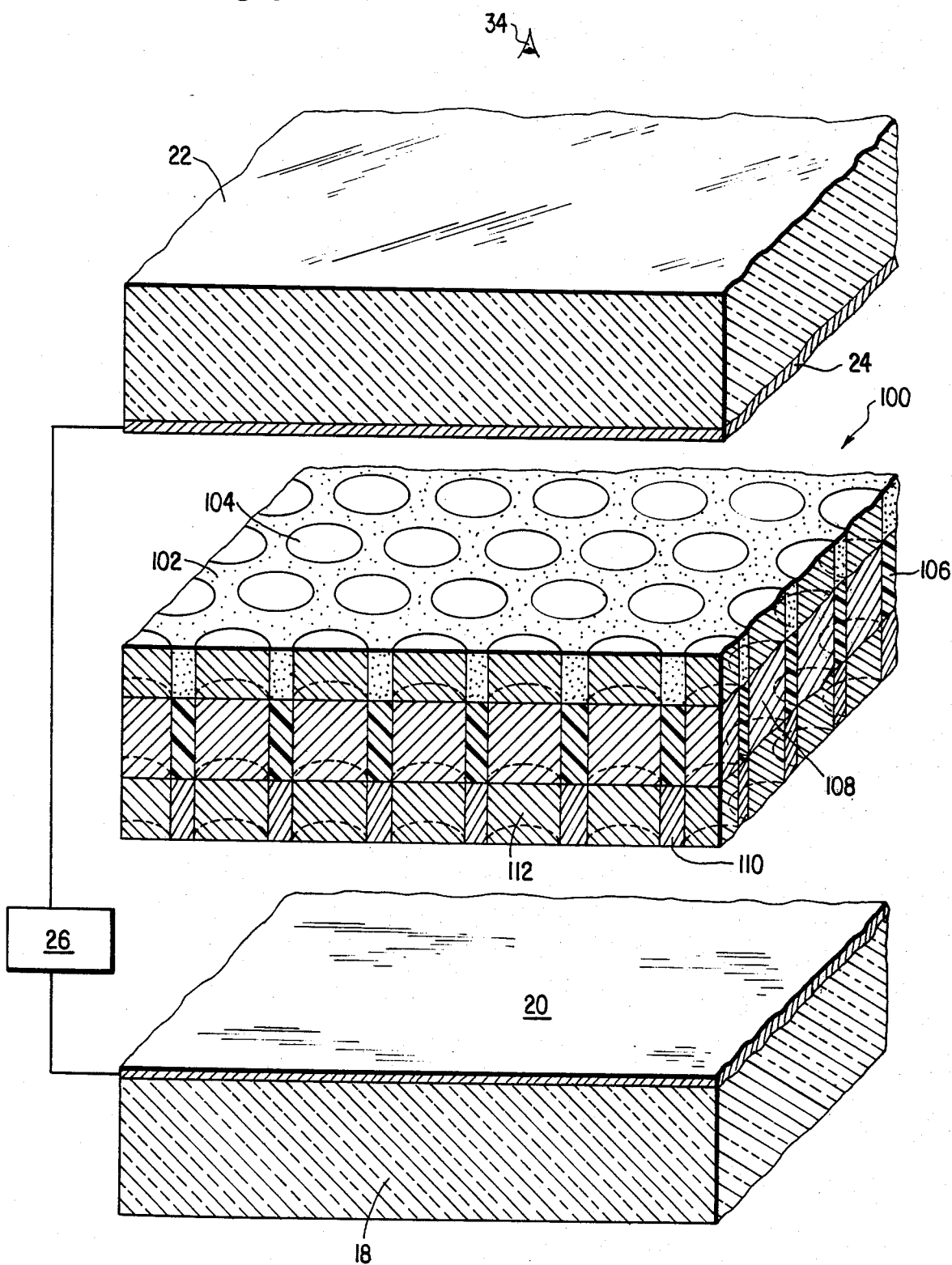
FIG. 19 is a partially schematic perspective view illustrating another embodiment of the invention.

Referring now to FIG. 19 of the drawings, an embodiment is illustrated wherein the photoconductor, conductor, and electro-optic medium are all in a regular, two-dimensional lattice arrangement. The numeral 100 denotes a three-layer element where dielectric sheet 102 thereof carries a plurality of apertures into which an electro-optic medium 104 is placed. Dielectric layer 106 carries a plurality of metallic studs 108. Numeral 110 denotes another dielectric sheet having a plurality of apertures in which are mounted photoconductive plugs 112. It is believed that the mode of operation of this embodiment will be immediately apparent and accordingly no description will be offered. The reader will note that the aligned apertures in the three-dielectric sheets making up composite member 100 are of the same diameter. This, however, is not necessary for the operation of the device. Further, the dielectric materials need not be of the same electrical resistivity, or permittivity.

Figure 20:
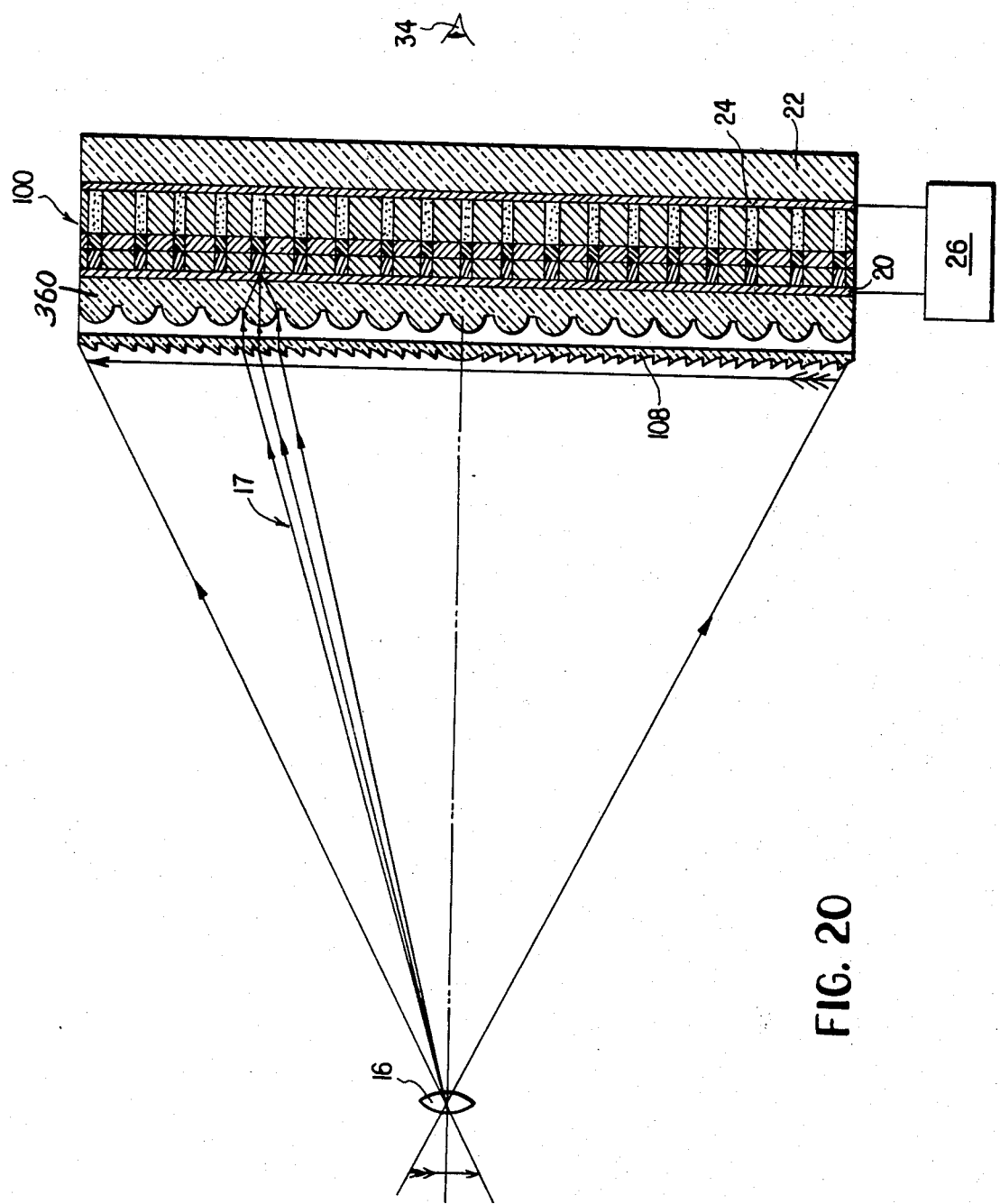
FIG. 20 is a partially schematic, cross-sectional view illustrating an embodiment of the invention wherein both a Fresnel lens and a lens plate are added to a typical light amplifier of this invention.

Referring now to FIG. 20 of the drawings, an embodiment is illustrated which employs tiny lenses (lenslettes) for the purpose of further improving the performance of the light amplifier of this invention. At FIG. 20, the light amplifying display panel embodiment shown at FIG. 19 is given by way of example. The numeral 360 denotes an integral array of lenslettes positioned directly against transparent and conductive coating 20. Thus, lenslette array 360 is substituted for the transparent sheet 18 in the previously described embodiments. Additionally, a Fresnel lens 108 is positioned contiguous to lens array 360. At FIG. 20, the object is illustrated as an arrow with rays therefrom passing through lens system 16. In operation, the Fresnel lens 108 and the lenslette plate 360 increase the efficiency of the device and thereby lower power requirements of the light amplifier. Light carrying the information is incident on Fresnal lens 108 whose focal length may be equal to the distance between the lenses of lens plate 360 and the lens 16. Because of the Fresnel lens, light rays from the object become parallel, and the lenses of plate 360 concentrate light from the Fresnel lens. The concentrated light and the photoconductor elements of the lattic member 100 are made to optically coincide. This is indicated by the light rays 17 at FIG. 20, wherein the reader will see how the rays are first made parallel by the Fresnel plate 108 and are then concentrated by one of the lenses on lens plate 360 and thereby fall upon one of the photoconductors of assembly 100.

Figure 21:
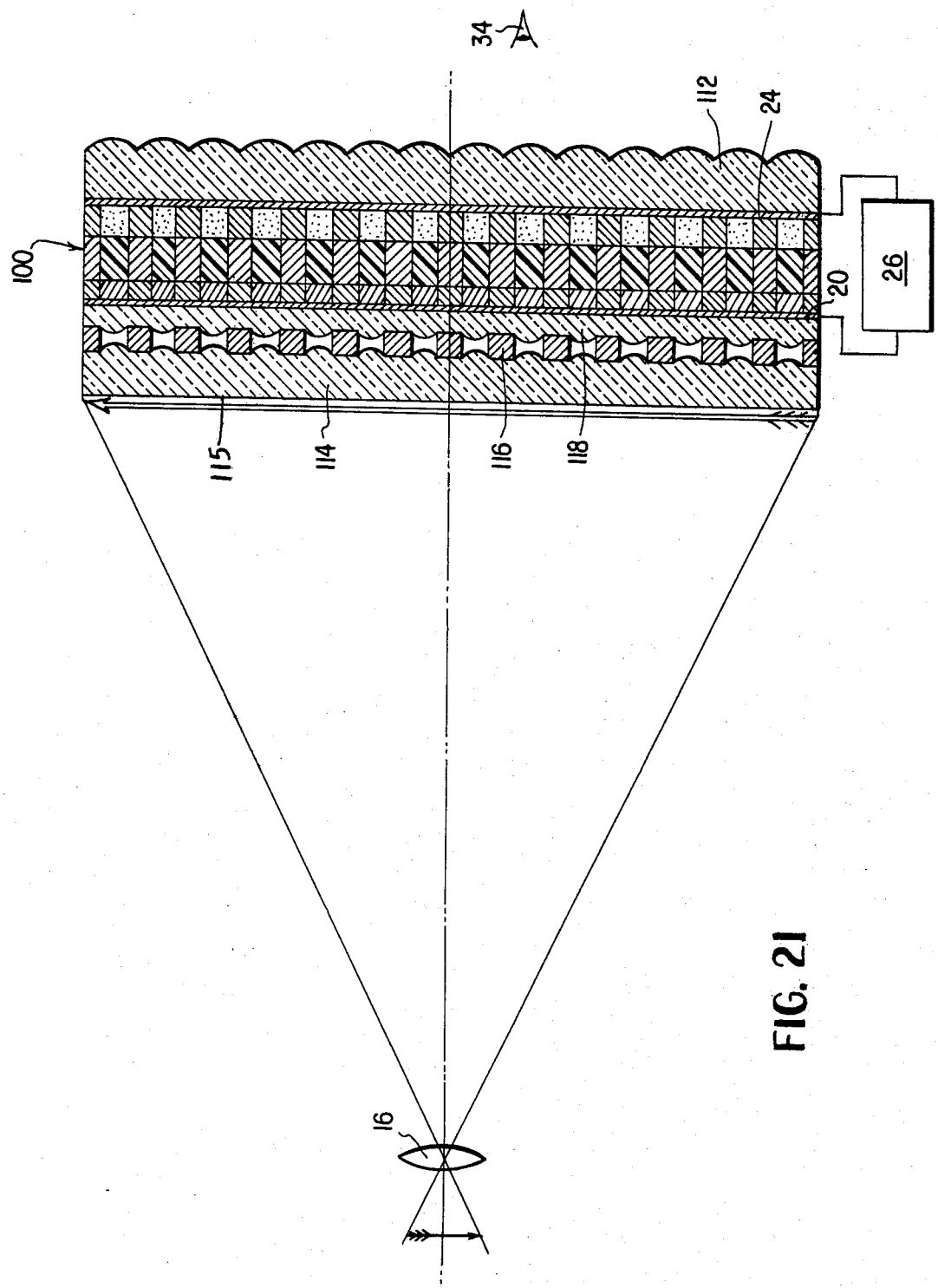
FIG. 21 is a view similar to FIG. 20 and shows another embodiment.

FIG. 21 illustrates a similar and somewhat more complex structure which improves the overall performance of the light amplifying display elements. At FIG. 21, a light gathering laminate is defined by a first lens plate 114 having integral lenses at its right face, spacer and field stop elements 116 between these lenses, and a second lens plate 118 having its lens surface on its left face. 115 denotes a diffuse coating on the flat surface of lens plate 114. Sheet 22 is replaced by a lens plate 112 having integral lenses on its exposed surface. The device as assembled is indicated at FIG. 21, with the focal length of the system chosen such that the magnification of the images formed by the lenslettes of lens plates 114 and 118 just fill the several photoconductive cylinders in array 100. The lenses of lens plate 112 form a virtual image whose size is determined by the location of the observer at 34.

FIGS. 22 and 23 illustrate still another embodiment of a new type of light amplifier according to the process of this invention wherein the gravure-type high electric fields which are generated are positioned on the transparent, conductive coating which is adjacent the viewing sheet 22. In FIG. 22, the numeral 126 denotes a sheet of photoconductor material of the type whose electrical resistance markedly decreases when subjected to light. The numeral 128 denotes an opaque dielectric sheet, in turn adjacent to, for example, liquid crystal block or sheet 32. Very thin conductive gravure lattice discs 460 carried by transparent, conductive sheet 124, with insulating spacers 127 between the gravure lattice discs 460. FIG. 23 is an exploded view of the elements shown at FIG. 22, except that the insulating portions 127 are not illustrated. The discs 460 may assume the form of conductive deposits on conductive layer 124. If the thickness of these conducting deposits is too large, opacity starts to set in and the light amplifier begins to fail in its function. The mode of operation of the embodiment shown at FIGS. 22 and 23 is as follows. The conductive deposits 460, being transparent, give rise to a higher electric field at regions aligned with them than the electric field applied between transparent, conductive coatings 20 and 124 in the interdeposit regions. Light from an object striking the left face of transparent sheet 18 modulates, in an already-described manner, the resistivity of photoconductor 126. Accordingly, those gravure points corresponding to discs 460, which are within the image received from the object, undergo an increase in electric field with the result that observer 34 sees a gravure display.

Figure 24:
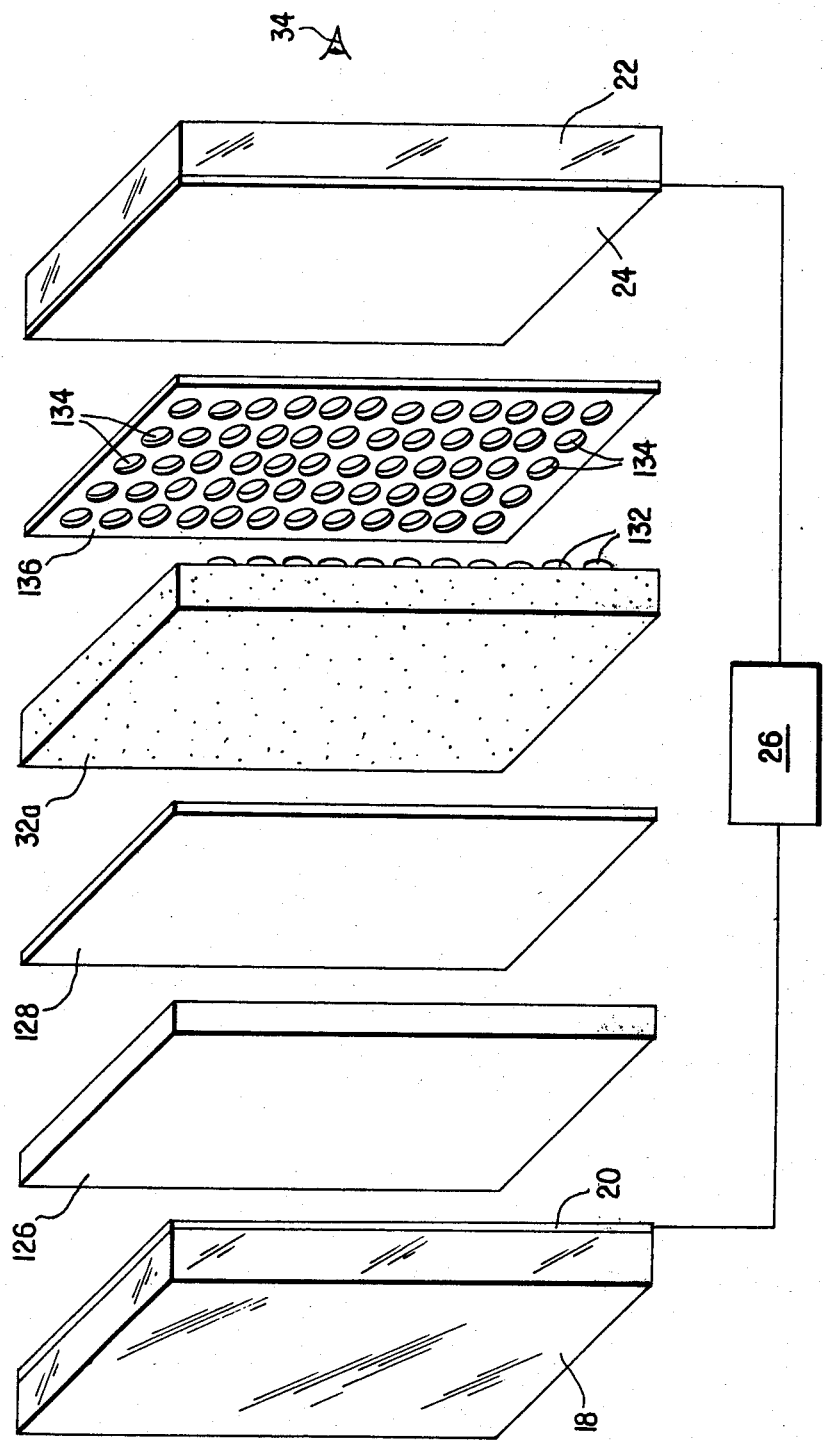
FIG. 24 is a partially schematic perspective view of a light amplifier of the type shown at FIG. 10, with the modification that all of the liquid in a certain liquid crystal cell is in a continuous liquid body.

Referring now to FIG. 24 of the drawings, still another embodiment is illustrated. As in the embodiment of 23, the numeral 126 denotes a photoconductive sheet, while numeral 128 denotes a relatively thin opaque dielectric materail. The numeral 32a denotes a modified form of a liquid crystal sheet, for example, one which includes projections 132 on its right face, the projections 132 fitting into complementary apertures 132 of dielectric plate 136. Apertures 134 function to support the projecting elements 132. The electrically optically active elements 32a includes projections 132 on its right face so that electro-optic material constitutes a single volume.

Referring now to FIG. 25 of the drawings, the numeral 140 denotes conductive gravure points deposited on conductive coating 20 as by electro-deposition or vacuum sputtering. Elements 140 thus define the gravure lattice points according to this embodiment. The numeral 142 denotes a thin dielectric plate having apertures 144 which correspond to and which receive gravure lattice conductive points 140. One function of plate 142 is to inhibit cross talk. The numeral 126, as before, denotes a photoconductive sheet, while numeral 146 denotes a thin opaque, dielectric sheet. The mode of operation is believed obvious from what has been previously described. Thus, the electric field between conductive coatings 20 and 24 is the strongest at the gravure points 140, while the image of an object impinged upon the rear of transparent sheet 18 causes the local reduction in electrical resistivity at regions corresponding to the object. As with the embodiment of FIG. 23, the thickness of gravure conductive elements 140 must be held down so as not to interfere with transmission of light therethrough for impingment upon the photoconductor sheet 126.

Figure 26:
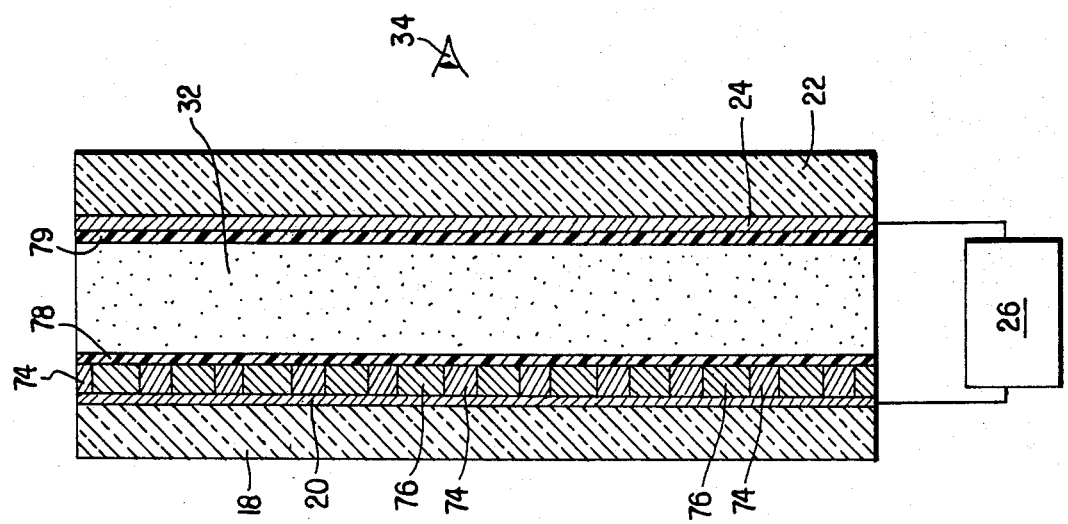
FIG. 26 is a view of an embodiment similar to that of FIG. 2 except that an additional sheet is added for impedance matching.

Referring now to FIG. 26 of the drawings, still another embodiment is illustrated. This embodiment differs from that shown at FIG. 16 in that it includes additional layers of insulating material, denoted by the numerals 78 and 79, for impedance matching between electro-optic medium and conductors 20 and 24 and which also serve as a protective cover between the ambient light side conducting layer and the electro-optic medium 32.

Figure 27:
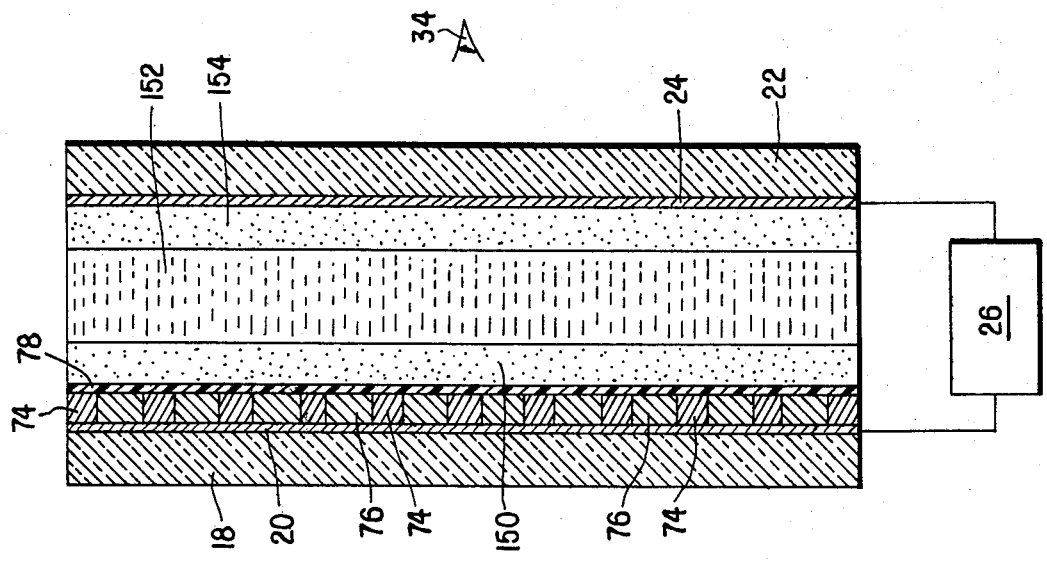
FIG. 27 is a cross-sectional view of a light amplifier of this invention wherein the electro-optic medium is defined by an electrochromic layer and wherein an electrolytic gel is added to increase conductivity.

Referring now to FIG. 27, a further embodiment is illustrated. This embodiment is similar to that previously described with respect to that of FIG. 26. The numeral 150 at FIG. 127 denotes an electrochromic layer positioned next to a slab or sheet of an electrolytic conducting gel, the latter denoted by the numeral 152. The numeral 154 denotes an electro-chromic layer identical in composition to layer 140.

The mode of operation of this embodiment is similar to that previously described. The attention of the reader is invited to U.S. Pat. No. 3,708,220 to Meyers et al which discloses what is shown at FIG. 27, with the exception of the gravure lattice element 74, 76.

Figure 28:
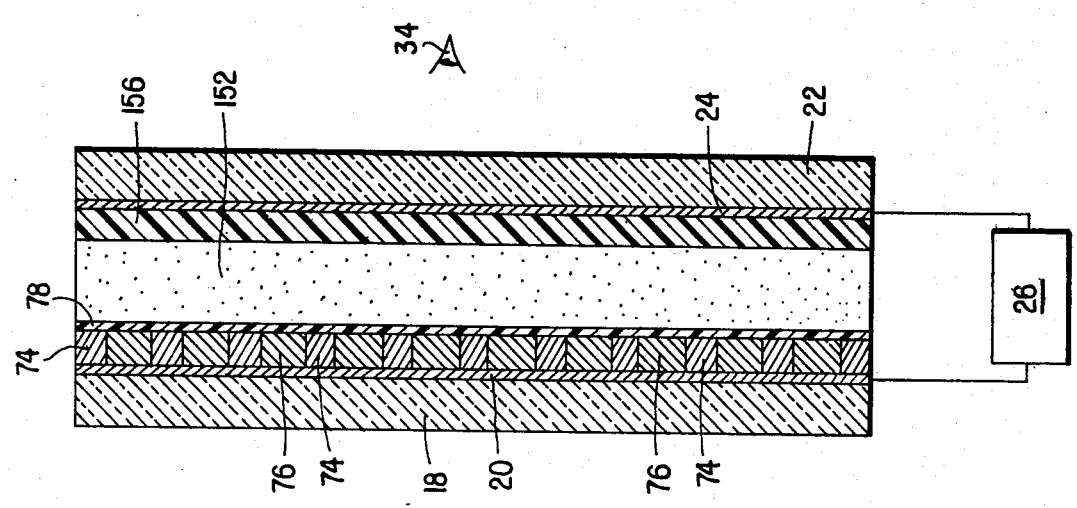
FIG. 28 is a partially schematic cross-sectional view of the light amplifier according to still another embodiment, similar to that of FIG. 2 except that a current carrier permeable insulator is positioned between the electrochromic layer and the conducting layer.

Referring now to FIG. 28 of the drawings, still another embodiment is illustrated which also employs an electrochromic gravure light amplifier. The numeral 152 again represents an electrochromic block or sheet, while the numeral 156 denotes a current carrier permeable membrane. The mode of operation is similar to that previously described with respect to the other embodiments. The attention of the reader is invited to U.S. Pat. No. 3,840,288 issued to Schnatterly and U.S. Pat. No. 3,521,941 issued to Debs, which disclose all of the elements illustrated at FIG. 28 except for the gravure lattice 74, 76.

Figure 29:
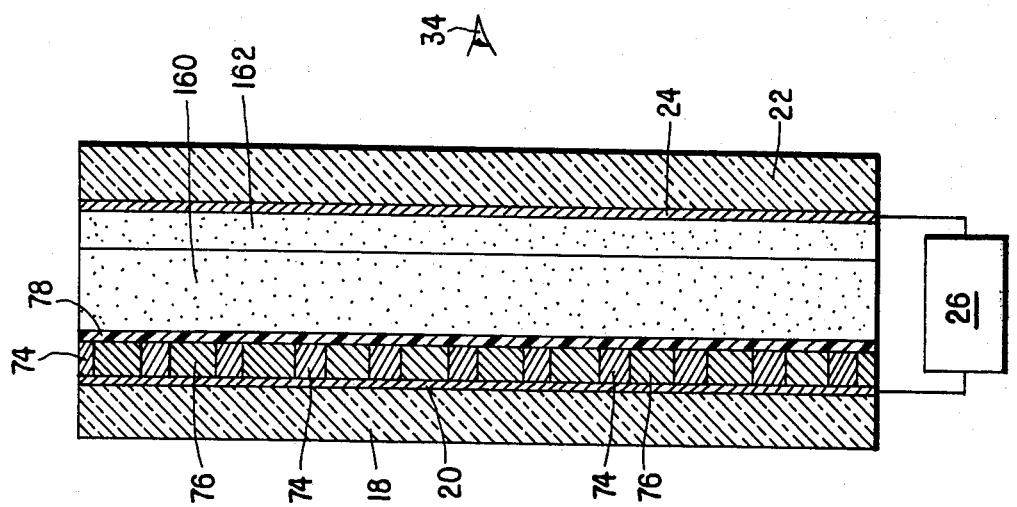
FIG. 29 is a view similar to FIG. 28 and shows an embodiment which includes two solid state ion layers.

Referring now to FIG. 29 of the drawings, still another embodiment is illustrated. The numeral 160 denotes an electrochromic layer containing either reducible ions $R^{+n}$ or oxidizable ions $O^{+m}$. The numeral 162 denotes an electrochromic layer also consisting of either reducible or oxidizable ions, but of the opposite type from that of layer 160. The attention of the reader is invited, with respect to the embodiments of FIG. 29, to U.S. Pat. No. 3,521,941 issued to Debs and U.S. Pat. No. 3,840,286 issued to Kiss. All the elements shown at FIG. 29 are known from these patents except for the gravure lattice 74, 76. The solid state elements 160 and 162 are of practical importance because of sealing or spacers are required as in liquid crystal or liquid electrophoretic devices. Again, all the layers are thin except for supporting structural layers.

At FIG. 29, the reducible ions are such that in a oxidation-reduction process the charge of the reducible ion decreases, e.g., by one electronic charge to $R^{+n-1}$, e.g., by electronic injection or ion migration with or without a change in the state of the color for the electrochromic medium, whereas an oxidizable ion increases its charge, e.g., $O^{+m}$ to $O^{+m+1}$, e.g., by hole injection. In an oxidation reaction either species or both can change their state of color, e.g., from a colorless state to a blue state or vice versa. Hence, either layer 160 or 162 can change its color state. Also, a single layer may be used as in FIG. 16 wherein the layer contains both $R^{+n}$ and $O^{+m}$ ions. However, the use of two layers such as 160 and 162 at FIG. 29 allows greater diversity of light amplifying display panels.

Figure 30:
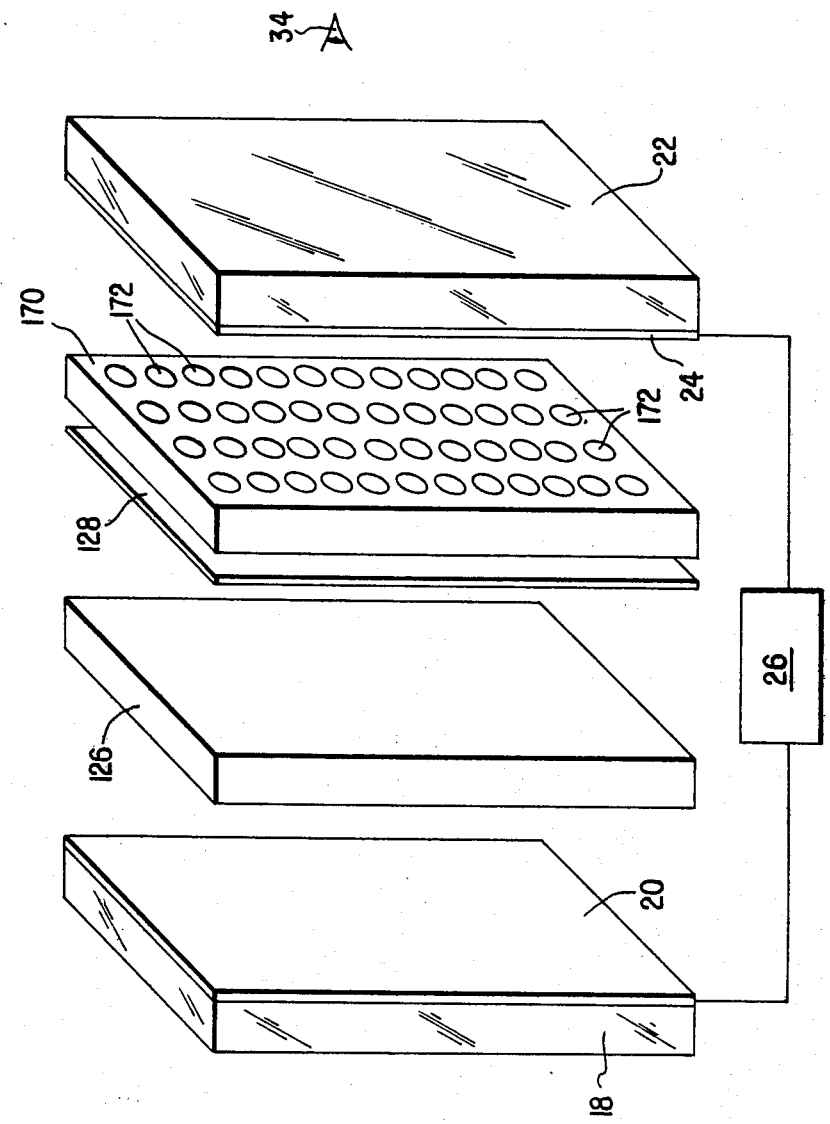
FIG. 30 is a view similar to FIG. 30 and illustrates an embodiment employing a particular solid state electro-optic material.

Referring now to FIG. 30, another embodiment is illustrated. Numeral 126 denotes a photoconductive sheet, while numeral 128 denotes a thin, opaque dielectric sheet. The electro-optic medium which generates the gravure pattern is defined by elements 170 and 172. Element 170 may be referred to as the host, while 172 as domains. If the domains contain $R^{+n}$ or $O^{+m}$ ions, then the host 170 is of the opposite type of ions. One well-known method for constructing such an element is by ion implantation utilizing a mask to delineate the lattice domains 172. The mode of operation is believed apparent.

Figure 31:
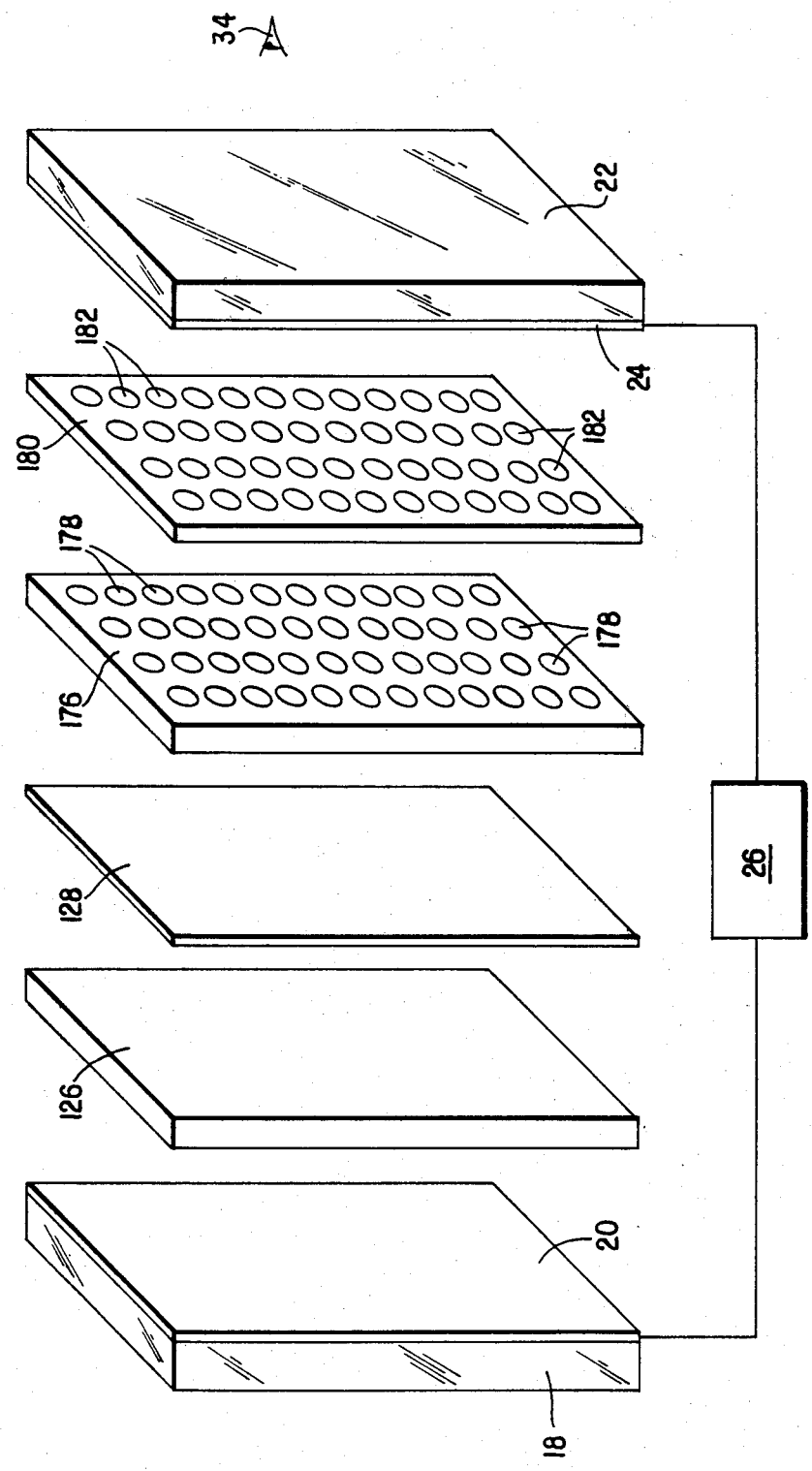
FIG. 31 is a view similar to FIG. 30 and illustrates an embodiment employing a different electro-optical solid state material.

Referring now to FIG. 31 of the drawings, a two layer electro-optic element is illustrated wherein the first layer thereof is a gravure lattice having a host 176 of an inert high resistance dielectric which carries lattice points 178 defined by materials having either $R^{+n}$ or $O^{+m}$ ions. The second layer is a lattice 180 of similar construction, containing either the $O^{+m}$ or the $R^{+n}$ ions, but of an opposite type to that of 178. Again, the mode of operation is believed apparent.

Figure 32:
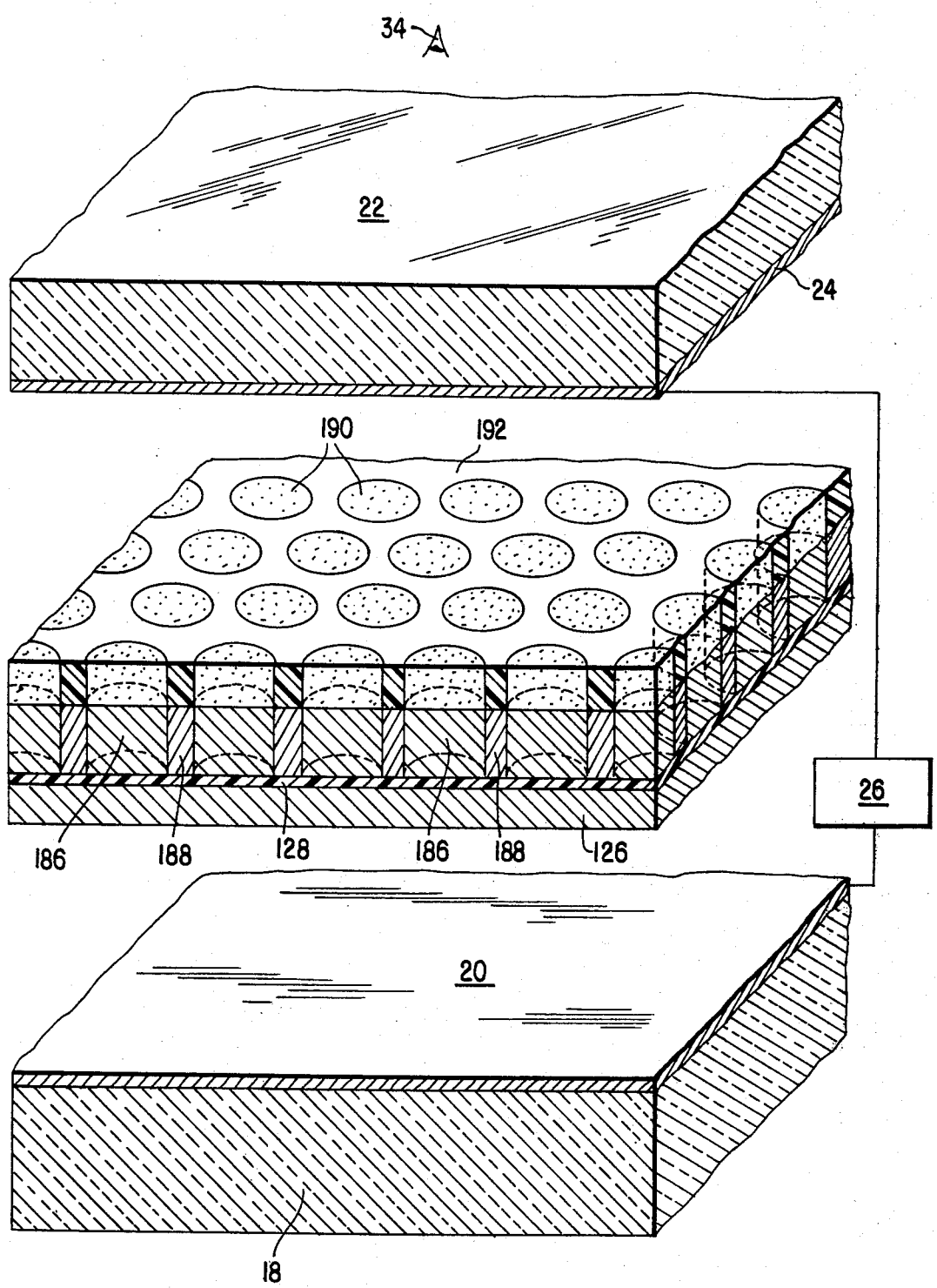
FIG. 32 is a partially schematic, perspective view illustrating still another embodiment.

Referring now to FIG. 32 of the drawings, an embodiment is illustrated similar to that shown at FIG. 19. The numeral 126 denotes a photoconductor sheet, while numeral 128 represents a thin, opaque dielectric layer. The numeral 186 indicates any one of a plurality of electrochromic domains containing either reducible ions $R^{+n}$ or oxidizable ions $O^{+m}$, in gravure lattice support element 188. Similarly, numeral 190 indicates gravure lattice point domains positioned in support 192. It will be understood that domains 186 and 190 are of the opposite type, i.e., one being of reducible ions $R^{+n}$ and the other being of oxidizable ions $O^{+m}$. The host materials 188 and 192 may be the same or may be different. The operation of this device is similar to those previously described and accordingly will not be offered.

Figure 33:
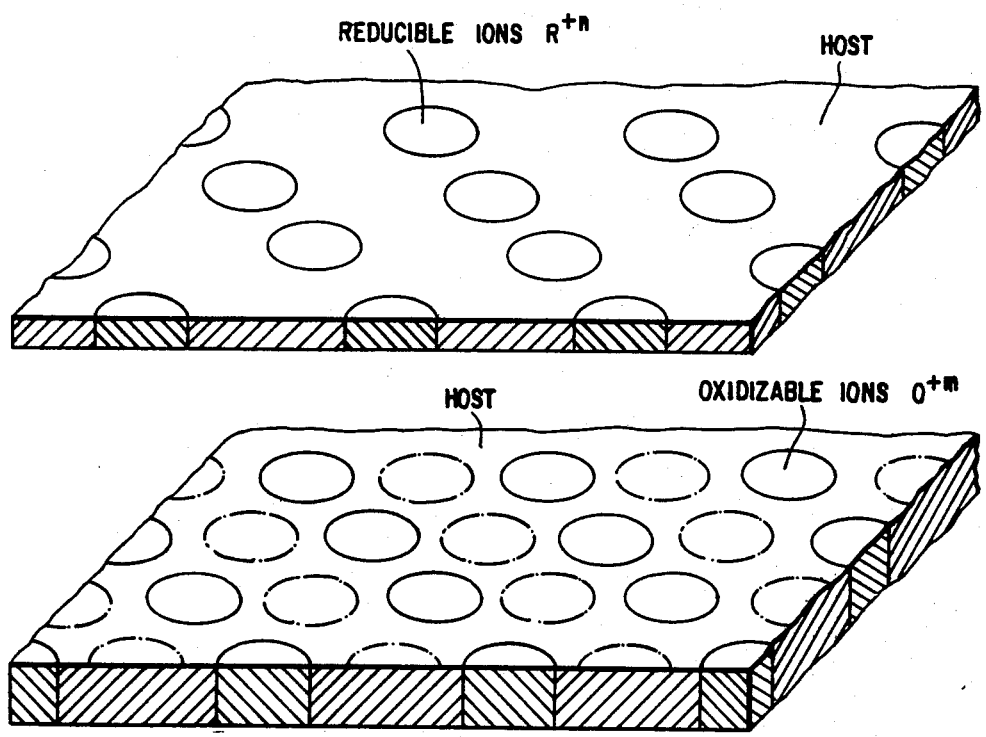
FIG. 33 is a perspective partial view and illustrates the case wherein the lattice array which contains certain reducible ions is displaced from a lattice containing certain oxidizable ions.

Referring now to FIG. 33, a partial view of still another embodiment is illustrated for the case where the lattice which contains the reducible ions $R^{+n}$ is displaced or spaced from the other lattice which contains the oxidizable ions $O^{+m}$. If the uppermost host layer is transparent, several color combinations are possible.

In the several embodiments of FIG. 29–33, the reader will note that either the absorptive, or reflective, or scattering modes or combinations are possible depending upon the nature of the opaque layer which separates a photoconductor sheet from the electro-optic medium or sheet.

In the preceding embodiments of FIGS. 1 to 33, several modifications of light amplifiers have been disclosed which employ electro-optic media such as liquid crystals, electrochromic ions, electrophoretic particles of ferroelectrics. These light amplifiers are characterized by extremely low power consumption, long life, high contrast, high resolution, large solid angle viewing. They further exhibit the property that the brighter the ambient light, the brighter the display as seen by the observer. Further, they are inexpensive to produce in mass quantities. However, no one of these embodiments exhibits the property of amplifying color information faithfully.

Figure 34:
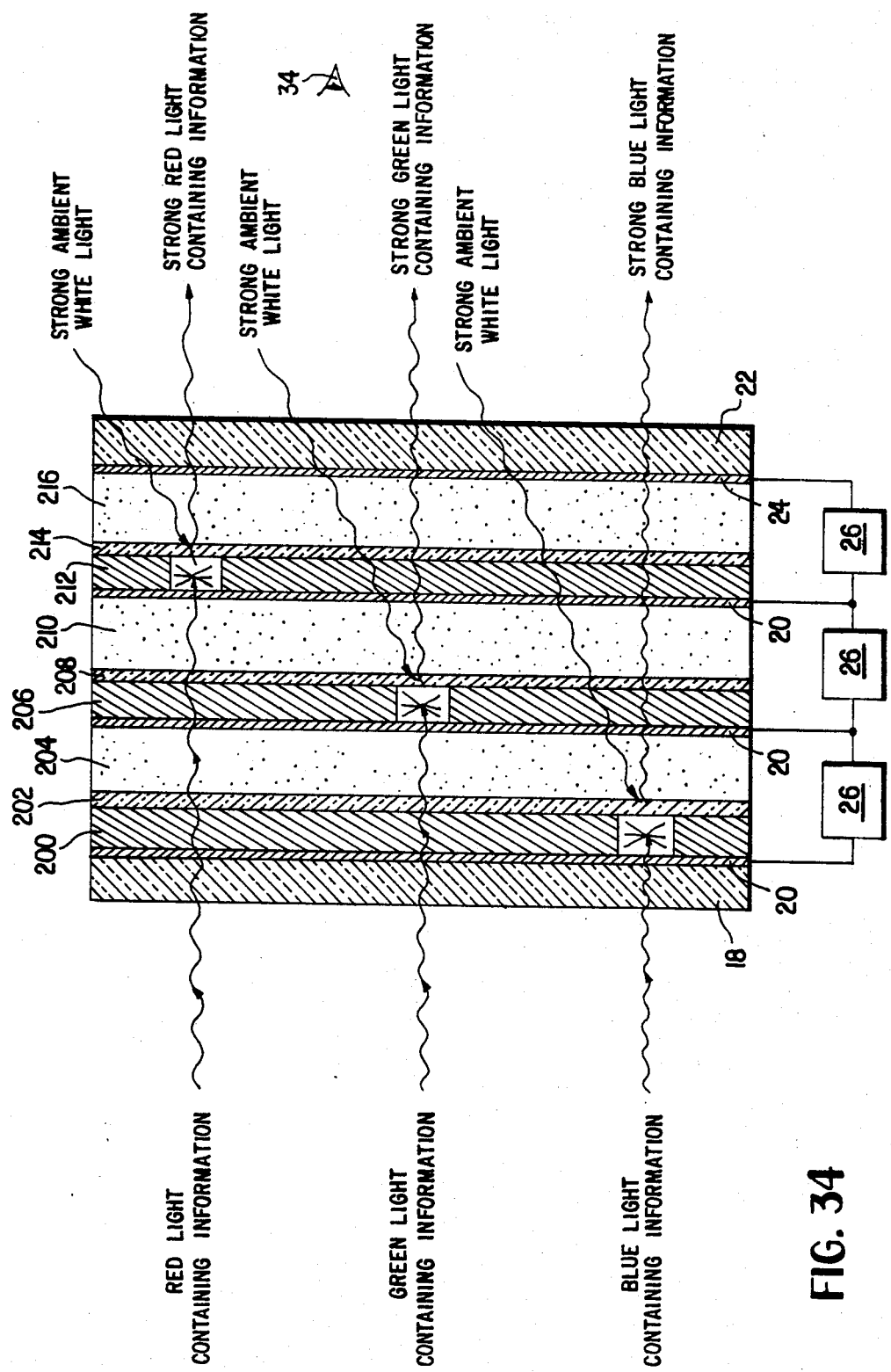
FIG. 34 is a partially schematic cross-sectional view of a light amplifier of this invention which permits the use of color light amplification.
Figure 35:
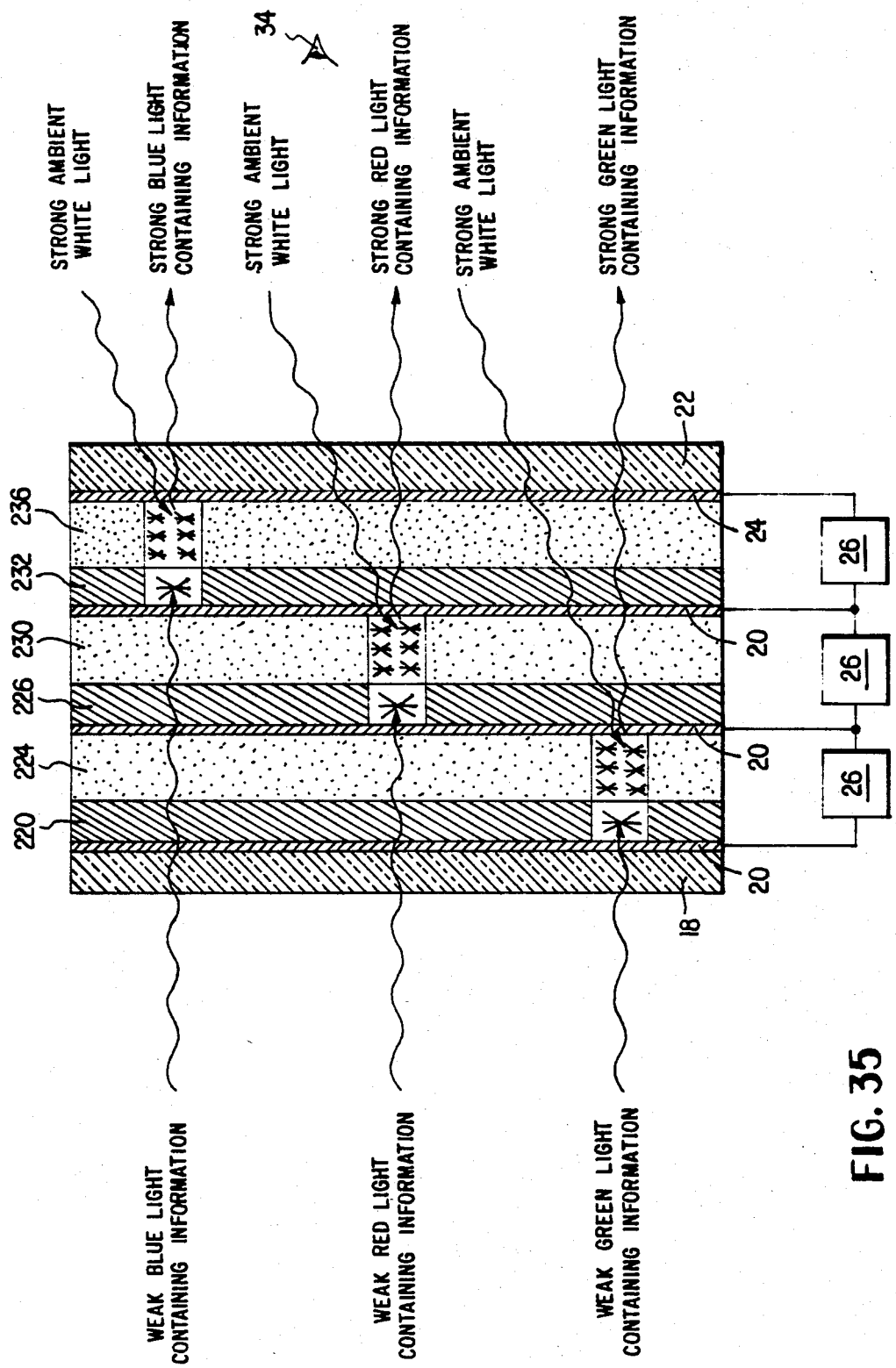
FIG. 35 is a view similar to FIG. 34, and illustrates another embodiment wherein colored light may be amplified.

Referring now to FIG. 34, an embodiment is illustrated of a light amplifier wherein colored light may be amplified. This particular embodiment does not employ a gravure element such as those previously described. The embodiment to be described at FIG. 34 is termed additive in that it uses three primary additive colors red, blue and green, while a similar embodiment described at FIG. 35 is termed subtractive. Referring now to FIG. 34, the numerals 18-26 denote the same elements as those bearing these reference numerals in the previously described embodiments. The numeral 200 denotes a photoconductive sheet which is sensitive only to blue light. That is to say, it is only when blue light strikes photoconductor 200 that lessening of electrical resistivity occurs across it. The numeral 202 denotes a dichroic mirror which reflects (towards the right) only blue light and passes light of other colors. The numeral 204 denotes an electro-optic medium (such as a liquid crystal) which changes from blue absorption to blue transmission with increases of electrical field thereacross. The numeral 206 denotes a photoconductive sheet which is sensitive only to green light. Thus, only green light will cause substantial lessening of electrical resistivity thereacross. The numeral 208 denotes a dichroic mirror which reflects only green light (towards the right) and passes other colors. The numeral 210 denotes an electro-optic medium in the form of a sheet or slab which changes from green absorption to green transmission with significant increases of electric field across it. The numeral 212 denotes a photoconductor sheet which is sensitive only to red light. Thus, only when struck by red light will sheet 212 undergo significant decreases in electrical resistivity thereacross. The numeral 214 denotes a dichroic mirror which reflects only red light (towards the right) and transmits other colors. The numeral 216 denotes an electro-optic material in the form of a sheet which changes from red absorption to red transmission with significant increases of electric field thereacross.

The mode of operation of the device shown at FIG. 34 is as follows. Consider firstly the case of, for example, a single ray of blue light from an object impinging on transparent sheet 18. The light passes through transparent, conductive sheet 20 and impinges upon photoconductor 200. This photoconductor is sensitive to blue light and accordingly the electrical resistance thereof at the region struck by the ray markedly decreases, thereby increasing the electric field across electro-optic element 204 at this region. Element 204 now changes from blue absorption to blue transmission. Strong ambient light, coming in from right to left, passes through the now clear-to-blue region 204 and strikes dichroic mirror 202. The blue light is reflected from this mirror out to the observer at 34. Relatively strong ambient blue light which strikes all other zones or areas of element 204 is not reflected back to the observer 34 but is absorbed. This is because only at the region struck by the ray of blue light is the electrical field significantly increased to thereby cause the change from blue absorption to blue transmission.

A similar analysis holds for a ray of green light coming from an object and striking sheet 18. In essence, electro-optically active element 210 changes from green absorption to green transmission at the region of photoconductor 206 which are impinged by the ray of green light, with the result that the observer sees green light at that region. A similar analysis holds for a ray of red light striking red sensitive photoconductor 212, the latter acting in cooperation with dichroic mirror 214 and electro-optically active element 216 sensitive to red light.

The reader will now readily comprehend that the term reflective mode is applied to the embodiment of FIG. 34 because of the action of dichroic mirros 202, 208 and 214 in selectively reflecting the three different primary additive colored components of ambient white light to observer 34.

Referring now to FIG. 35, a similar embodiment is illustrated which employs an absorptive mode of light amplification of color. The reader will recall that the three primary subtractive colors are yellow, cyan, and magenta, these colors being, respectively, the complementary colors of blue, red and green. Numeral 220 denotes a photoconductor sheet whose electrical resistance decreases only when subjected to green light. Numeral 224 denotes an electro-optic sheet which is magenta colored and which therefor absorbs such green light. When an electric field is impressed across element 224, its color changes to green. Element 226 denotes a photoconductor sheet which is sensitive only to red light. The numeral 230 denotes a photoconductor sheet which is sensitive only to the color blue. The numeral 236 denotes an electro-optic medium which is colored yellow and which accordingly absorbs blue light. When an electrical field is impressed across element 236, its color changes from yellow to blue.

The mode of operation is of the light amplifier shown in FIG. 35 is as follows. Assume a weak ray of green light from an object at the left of the device to impinge upon photoconductor sheet 220. Photoconductor 220 will become highly conductive at this region. The electro-optical material 224, initially magenta, now becomes green. The green component of ambient light can reach the element 224 and is scattered at the region adjacent the ray of green light which struck photoconductor 220. Elsewhere, the green component of ambient light is absorbed because the magenta absorbs green and there is not other local increase of electric field, over element 224. It will also be noted that a portion of the green component of ambient light falls upon the photoconductor 220 to further enhance or amplify the electric field, to thereby obtain a feedback type of light amplification.

A similar mode of operation takes place with respect to weak red light coming in from the object and striking element 226, such weak red light passing through elements 220 and 224. Similarly, weak blue light from the object can pass through elements 220, 224, 226, 230 to reach photoconductor 232 and act in a similar manner on 236. Thus, the observer at 34 sees full color amplified light from an object.

Figure 36:
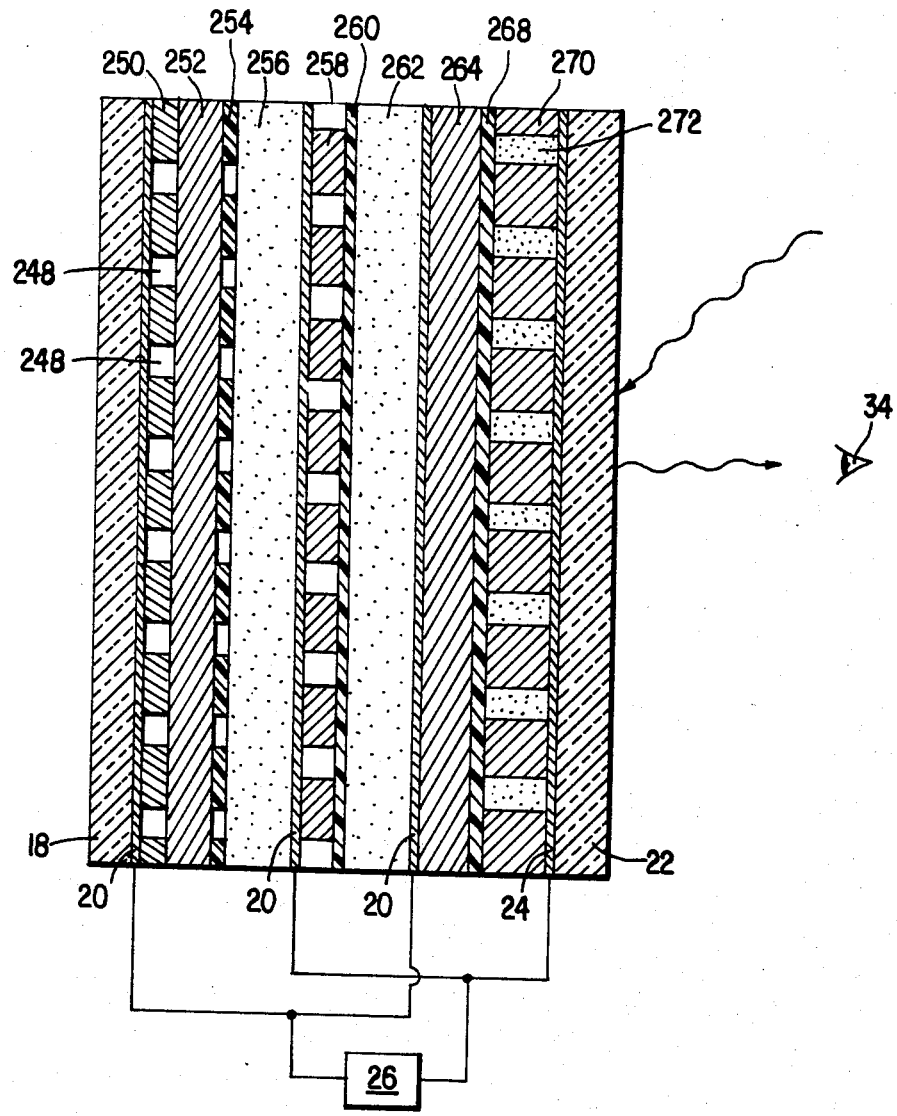
FIG. 36 is a cross-sectional view illustrating another modification of a light amplifier for color light.

The color light amplifier display panels of FIGS. 34 and 35 admit of modification to gravure light amplifying display panels. One example is illustrated at FIG. 36. At FIG. 36, the numeral 248 indicates a gravure lattice of holes in a dielectric insulator layer 250. The numeral 252 denotes a photoconductor sensitive only to a first color. The numeral 254 denotes a dichroic mirror, in gravure form, which reflects only light of that color but which transmits all other colors. The numeral 256 denotes an electro-optic element which changes from first color to clear. The next triad of elements 258, 260 and 262 are similar, but are matched for a second and different color. Similarly, elements 264 and 268 correspond to elements 252 and 254, respectively, but for still a third color. Element 270 indicates a dielectric panel which carries a plurality of apertures 272 in a regular array over its surface, each aperture containing an electro-optic material. The four conducting surfaces 20, 24, the three photoconducting layers 252, 258, 264, the three dichroic mirror layers 254, 260, 268, and the three electro-optic layers 256, 262, 270 may in one or any combination be made into a regular lattice array so as to generate a gravure type structure in one or several of the three groups or sets.

Figure 37:
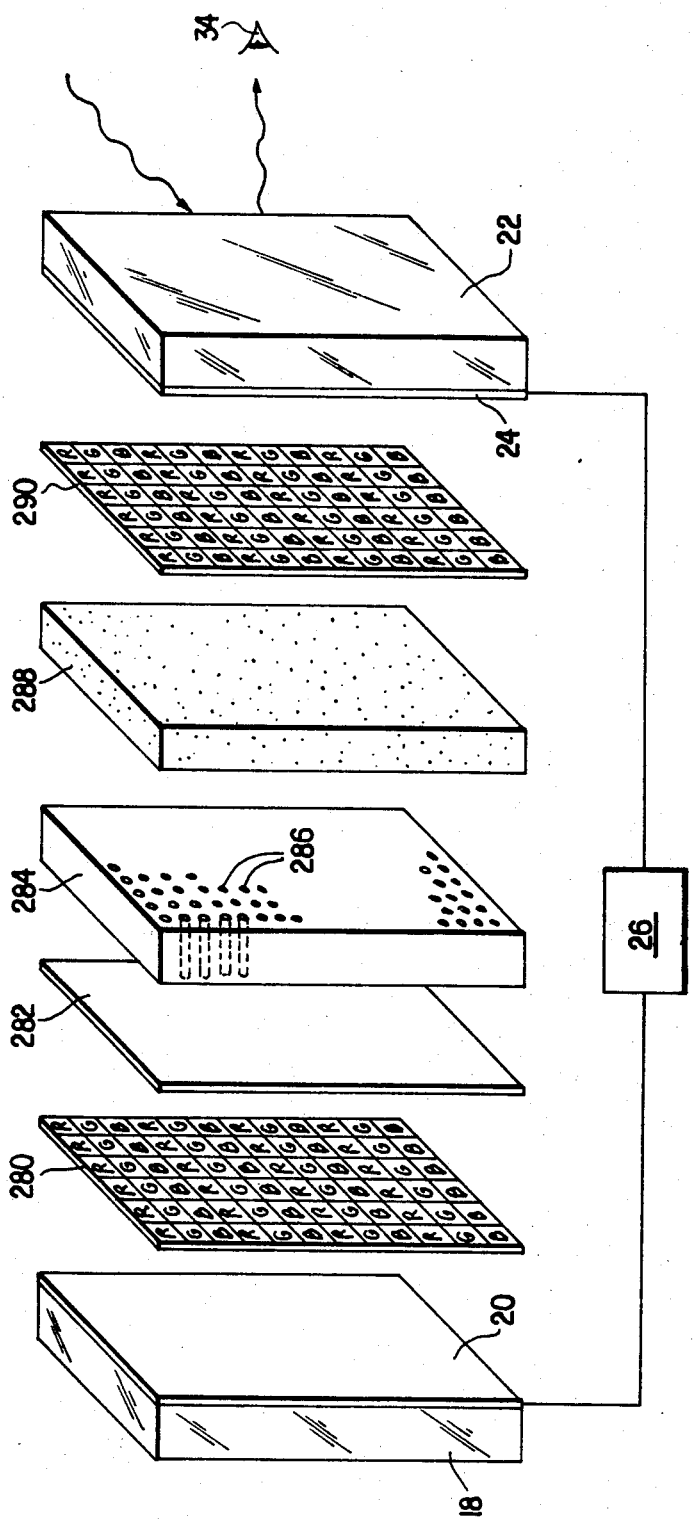
FIG. 37 is a view similar to FIG. 34 and illustrates still another embodiment for amplifying color light wherein light to be amplified first strikes a gravure lattice of primary color filters.

The three embodiments previously described may be termed sequential or serial color light amplifiers in the sense that a large number of layers is essential for the highest fidelity of color amplification. In the following description, another class of color amplifiers will be described which may be termed parallel and admits of significantly fewer layers. Roughly two-thirds fewer layers are required and hence the cost of production, being proportional to the number of layers, is roughly one-third of serial chromic light amplifiers. In the parallel or spatially averaging system, only two conducting layers are employed and accordingly the electrical power consumed is approximately one-third of the series arrangement type amplifiers. Referring now to FIG. 37, the numerals 18-26 denote the same elements are previously described. The numeral 280 denotes a gravure lattice of primary color filters for the additive colors red R, green G, and blue B. The individual color filters are arranged as indicated in the drawings. The numeral 282 denotes a photoconductive layer whose electrical resistance decreases when subject to light. The numeral 284 denotes a lattice array of cylindrical conductors 286 which are silvered on their right ends (the ends facing observer 34). The diameter of the conductors may be smaller than the gravure color filters of filter 280, but may not be larger, so that there can be no cross talk between different color signals. The numeral 288 denotes an electro-optic medium in the form of a block or sheet, followed by another color filter 290 of construction identical to color filter 280.

The mode of operation is that due to the action of the electro-optic medium 288, if no light induced electric fields are present, relatively strong ambient light is absorbed in color filters 290. When high electric fields are present due to light from an object to the left of plate 18, the electro-optic medium 288 becomes clear. In that case, the relatively strong ambient light strikes the mirrored ends of cylindrical light conductors 286, is reflected and exits through the primary color filter 290. It will be observed that filters 280 and 290 must be carefully aligned and matched. Thus, assuming only red light from an object, the red light only will pass through filger 280 with the result that photoconductor 282 is markedly decreased electrically at regions corresponding to the red filters of filter 280. In turn, regions of electro-optic medium 288 corresponding to these red filters become clear to thereby yield the action above described.

Figure 38:
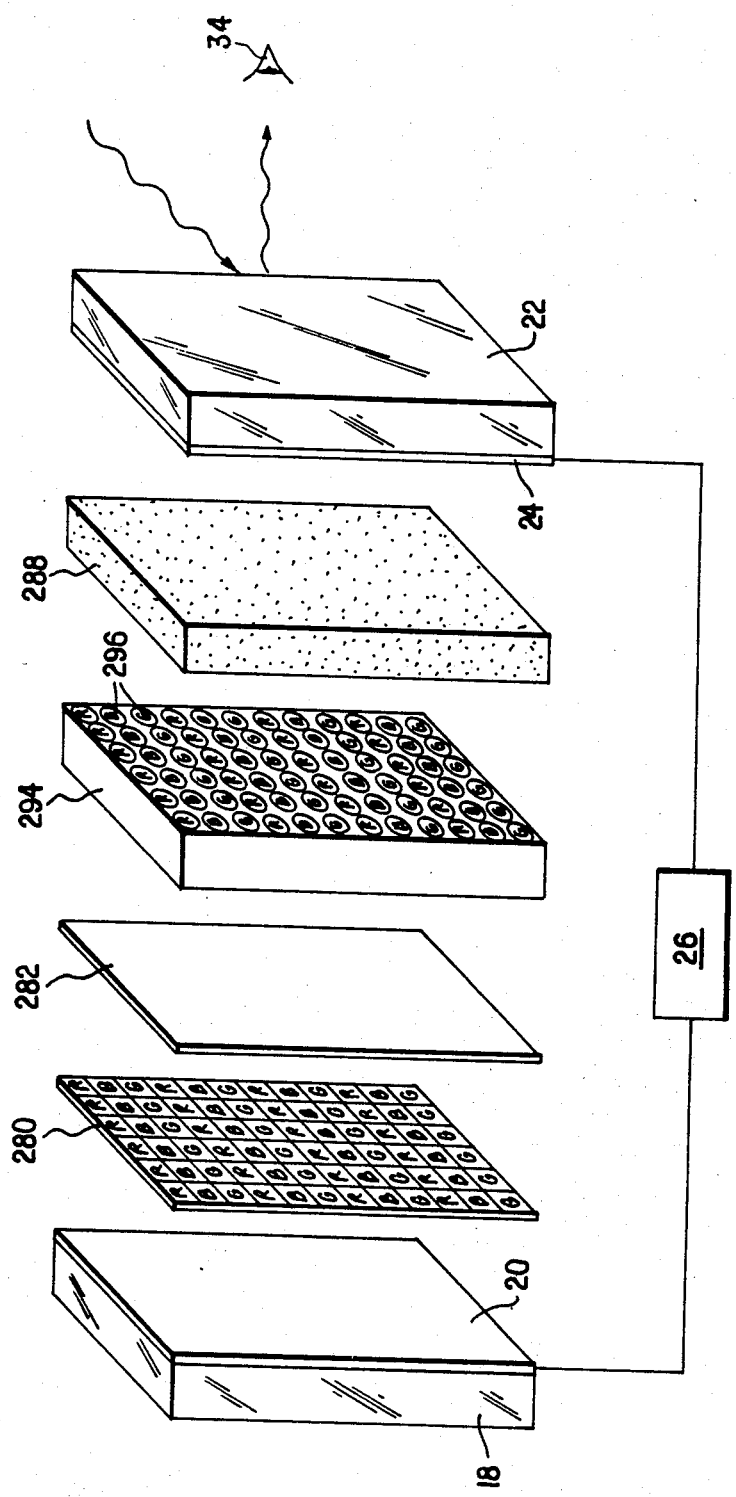
FIG. 38 is a partially schematic perspective view showing a light amplifier for color according to another embodiment.

Referring now to FIG. 38, a light amplifier is illustrated which performs the same colored light amplifier function as the device of FIG. 37, but by using colored mirrors. Thus, the numeral 294 denotes a gravure lattice defined by light conducting rods 296. The rods are each aligned with a respective filter of filter plate 280, and the right-hand ends (facing observer 34) of rods 296 colored. The colors correspond to the matching filters of filters 280. The mode of operation is believed evident from the description of the mode of operation of FIG. 37.

Figure 39:
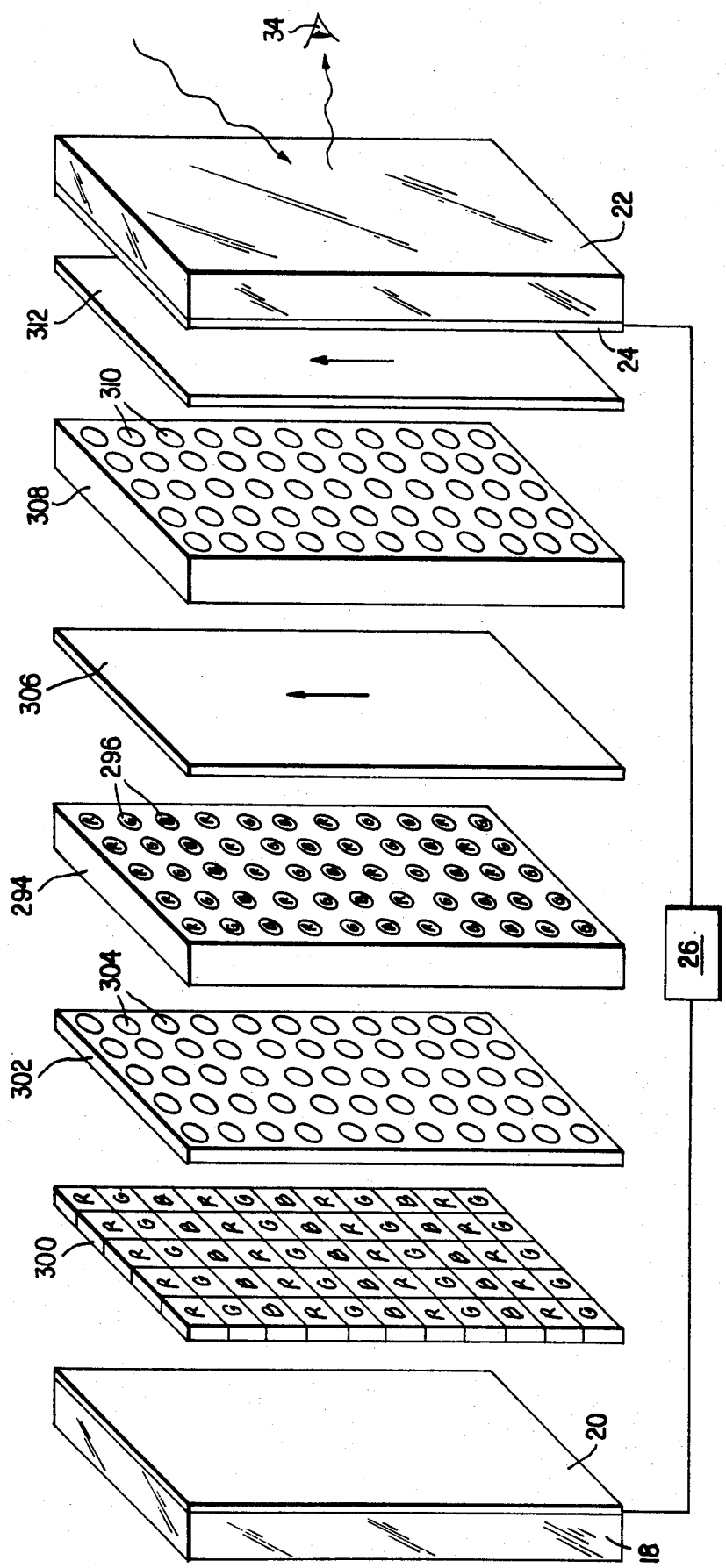
FIG. 39 is a view similar to FIG. 38 and illustrates a color light amplifier which employs crossed polarizers.

Referring now to FIG. 39, another manner of obtaining the same light amplification result is illustrated, here employing the well-known field effect possible with crossed polarizers. The numeral 300 represents a color filter similar in construction to color filter 280 of the previously-described embodiment. The numeral 302 denotes a photoconductor plate having discrete photoconductive elements 304 each aligned with a single color filter of filter plate 300. The numerals 294 and 296 indicate the same gravure lattice array described with respect to FIG. 38. The numeral 306 denotes a vertical polarizing plate which vertically polarizes light passing through it and absorbs the horizontal component of light incident thereon, as indicated by the vertical arrow. The numeral 308 indicates a block having cavities 310, the cavities 310 containing a twisted nematic liquid crystal which causes the axis of polarization of plane polarized light to rotate 90°. The numeral 312 denotes another vertical polarizer similar to polarizer 306. In operation when an electric field is applied to the nematic liquid crystal in any one or several of the cavities 310, light passing therethrough is no longer rotated 90° by the crystal and accordingly light passes from ambient through each of plates 312, 308 and 306 and to the colored ends of conductingrods 296 for reflection therefrom and back through 306, 308 and 312 and color viewing by an observer 34.

Figure 40:
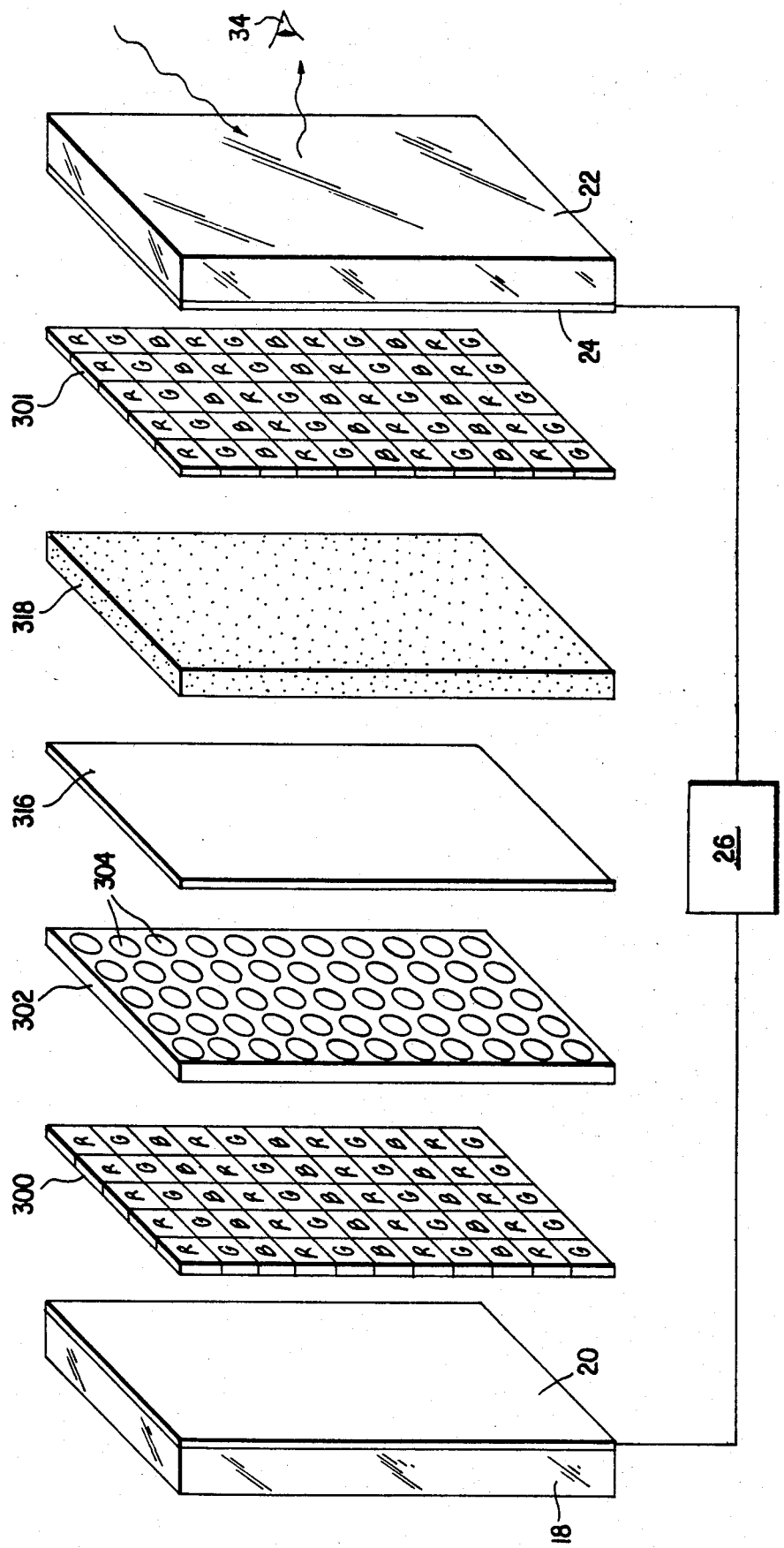
FIG. 40 is a partially schematic perspective view illustrating a light amplifier for colored light according to still another modification.

Referring now to FIG. 40, another colored light amplifier is illustrated wherein a gravure primary color lattice 300 is aligned with sheet 302 carrying discrete photoconductor elements 304 and each of which is aligned with a single, different color filter of lattice 300. The numeral 316 indicates an opaque barrier sheet which may be either black, white or may be a dielectric mirror. The numeral 318 denotes an electric-optic medium and the numeral 301 indicates a (second) primary color filter. If the opaque layer 316 is white or reflective, then the mode of operation is such that in the OFF stage, i.e., with no electric field present, ambient light is absorbed by sheet 318 and does not reach white or reflective layer 316. In the ON phase the electro-optic medium 318 or portions thereof, under the action of increased electric field thereacross, become clear and the primary colors which are passed by the second filter 301 reach the white or reflective surface 316 and come back out again towards observer 34.

Figure 41:
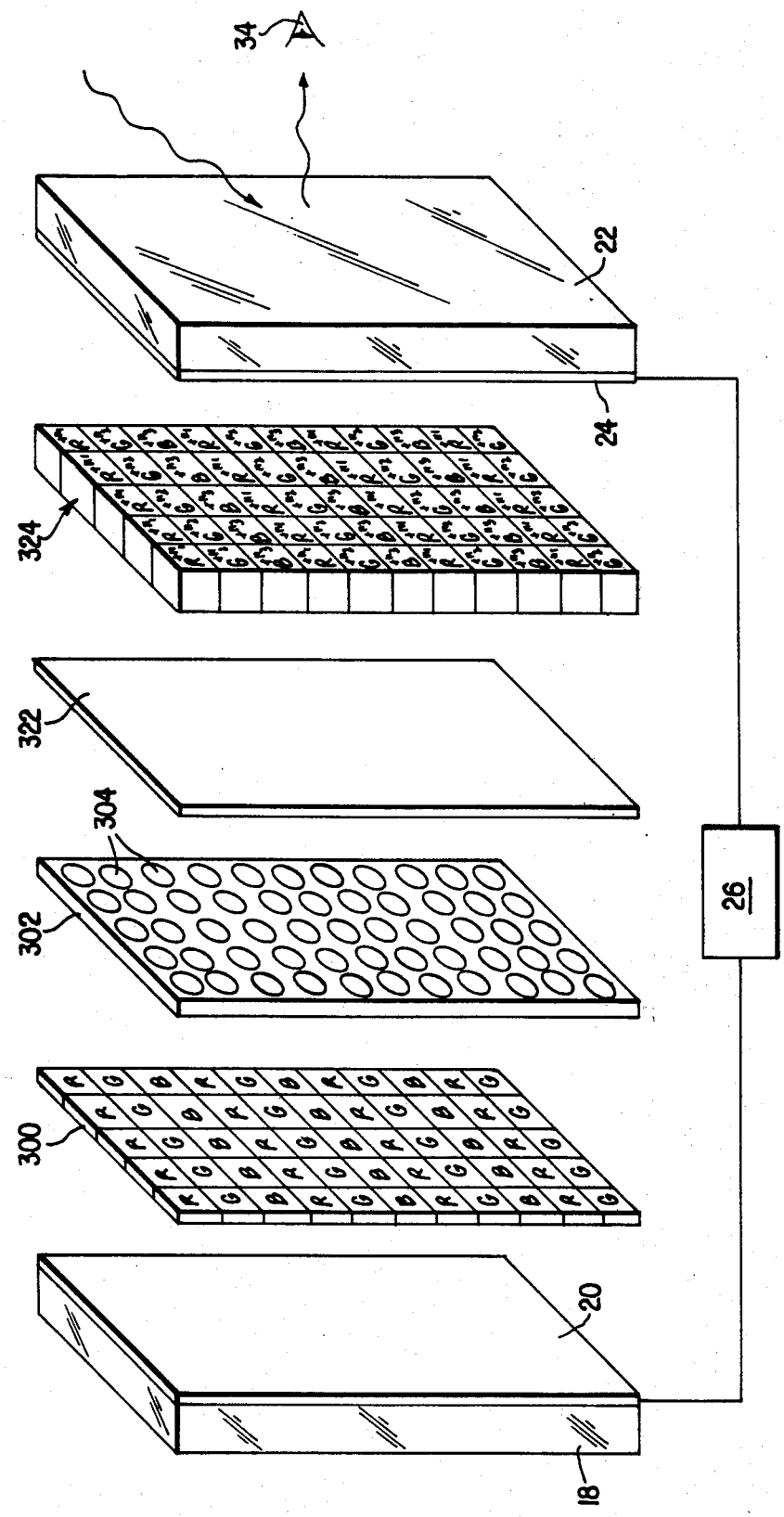
FIGS. 41 and 42 are partially schematic perspective views of light amplifiers for colored light illustrating different electrochromic solid state media.

Referring now to FIG. 41, another embodiment is illustrated, here employing electro-chromic solid state media. A primary color gravure lattice 300 has its color flter each aligned with a respective one of several individual photoconductors 304 of sheet 302. Alternatively, sheet 302 may be a continuous photoconductor sheet. The numeral 322 indicates an opaque dielectric barrier having a white scattering surface or mirror on the ambient (right) side. The numeral 324 denotes a sheet having a lattice of material which contains red ions $R^{+n1}$, green ions $G^{+n2}$ and blue ions $B^{30\ n3}$. On the OFF state, corresponding to the absence of strong electric fields thereacross, the materials in lattice 324 are opaque. However, when a strong electric field is placed across these elements, they act as color filters. Thus, if red light is incident from the left on transparent sheet 18, the electric field locally increases (as previously explained) across the red ion containing regions of lattice 324 with the result that the material of lattice 324 which contains the red ions functions as a red filter. This will permit red light only from ambient to pass through lattice 324, strike element 322, and then be reflected back to the observer at 34. A similar mode of operation takes place with respect to the green and blue ion containing material.

Figure 42:
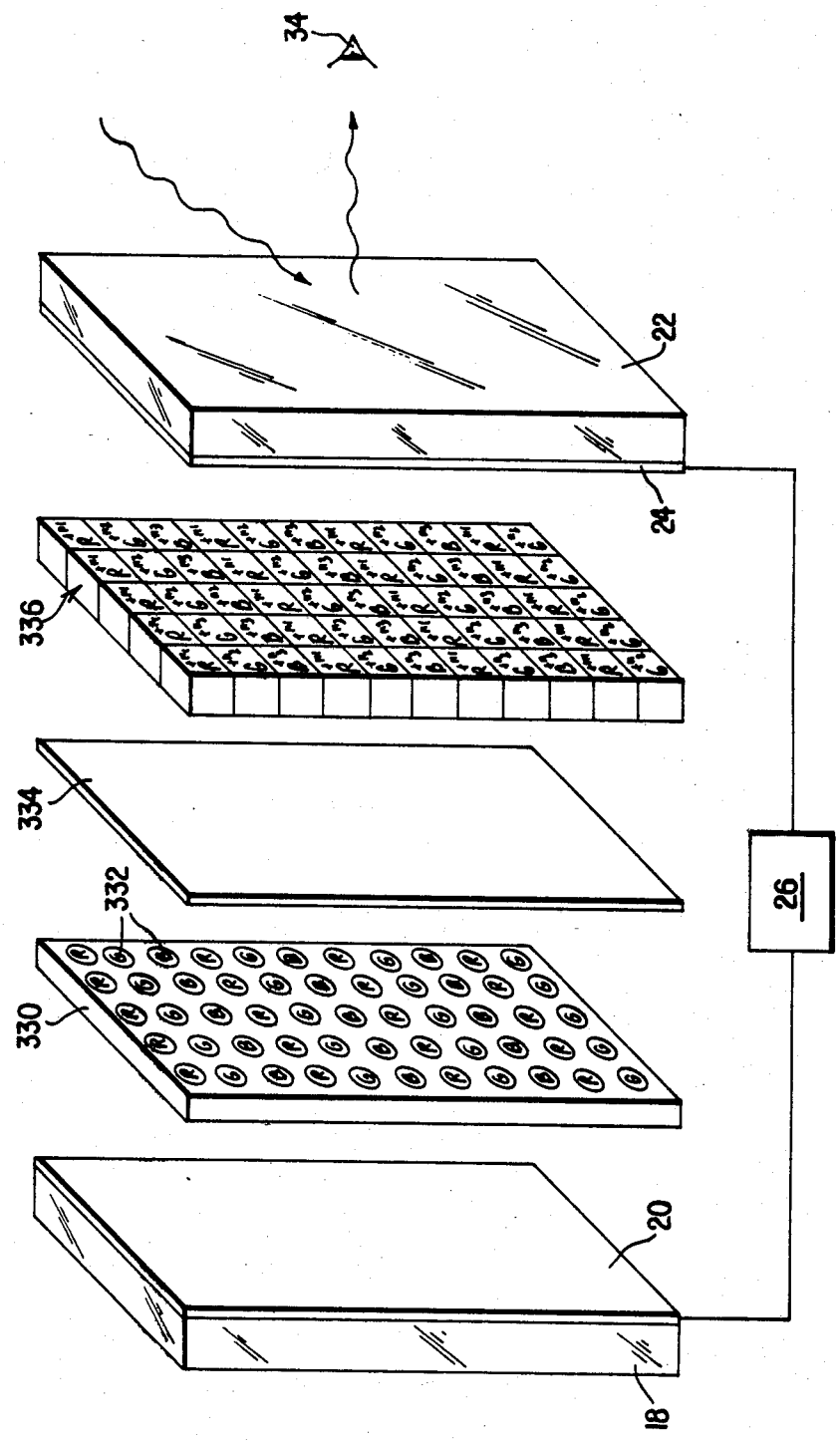

Referring now to FIG. 42 of the drawings, an embodiment is illustrated employing a photoconductor sheet 330 containing photoconductor elements 332, wherein each photoconductive element 332 responds to one color only. Thus, the blue (B) photoconductors respond only to blue light, the green (G) photoconductors respond only to green light, and the same for the red (R) photoconductors. Element 334 is identical in construction to element 322 of the previously described embodiment, and element 336 is identical to previously described element 324. Again, the mode of operation is believed evident.

Figure 43:
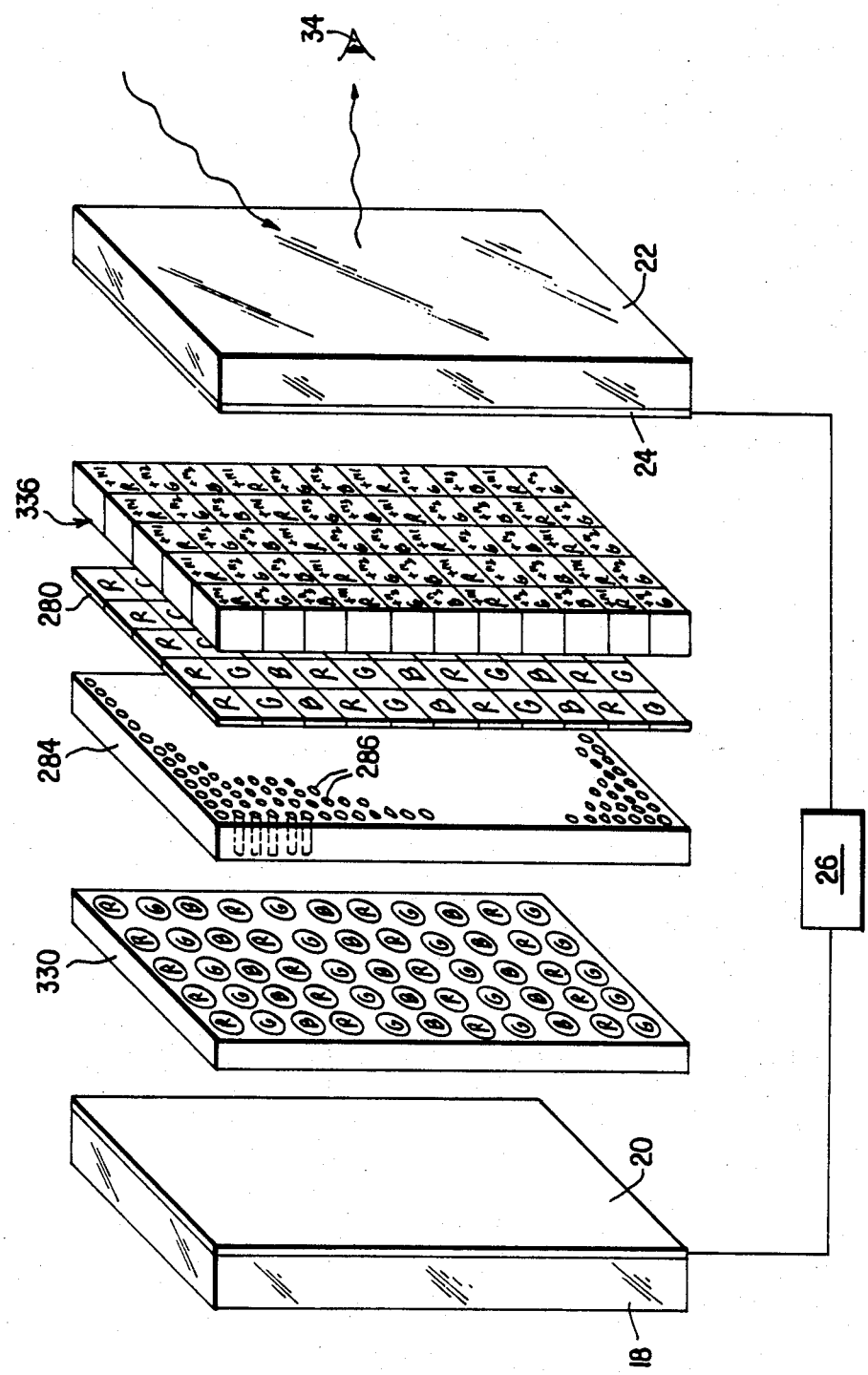
FIG. 43 is a partially schematic perspective view of a light amplifier for colored light and illustrates an embodiment having four out of a possible six layers arranged in a gravure lattice array.

Referring now to FIG. 43, another embodiment is illustrated of a color light amplifier. The numeral 330 denotes the same photoconductor sheet as that previously described with respect to FIG. 42. Likewise, the numeral 284 denotes a gravure lattice having electrical conducting rods 286 which are mirrored on their observer ends. The numeral 280 represents, as previously, a gravure lattice of color filters, while element 336 is the same as that bearing the same numeral and described with respect to FIG. 42. Thus, the colored light amplifier of FIG. 43 has four out of a possible six components or layers in the form of a gravure array. In this manner, less power is required and the accuracy of resolution is also controlled. Additionally, long time diffusion, if the electro-optic media are liquid crystals, or settling out of electrophoretic particles is prohibited by the inert barriers separating the several slugs or cells. The mode of operation is believed apparent.

Figure 44:
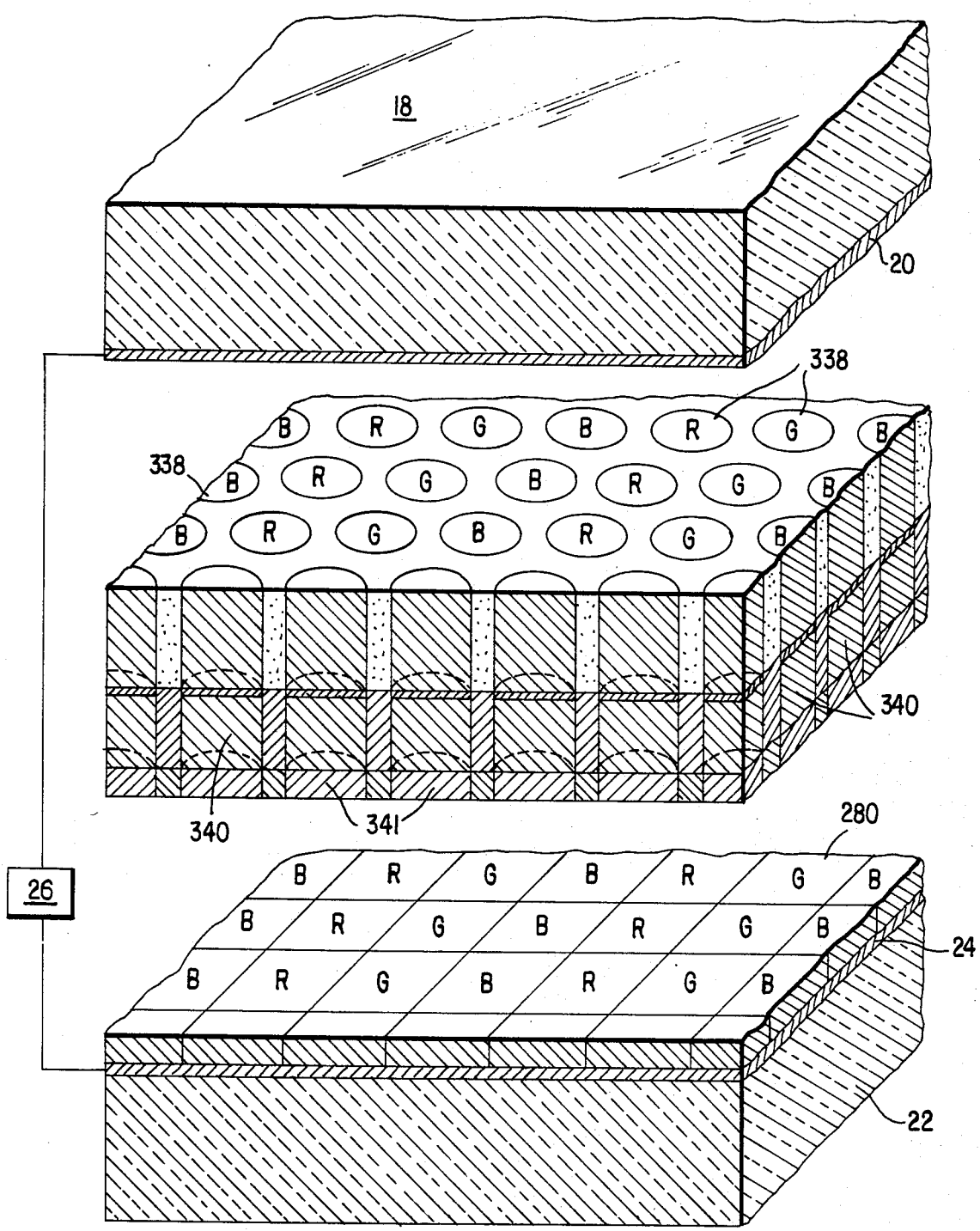
FIG. 44 is a partially schematic perspective view showing still another embodiment of the light amplifier for colored light wherein certain gravure electro-optical cells are bounded by solid anti-diffusion elements and wherein the ends of certain conductors are mirrored.

Referring now to FIG. 44, another color light amplifier construction is illustrated. The conductors in a gravure lattice array of cylindrical conductors 340 are mirrored at their observer ends. Photoconductor slugs 341 contact the mirrored ends and also each abuts a single, corresponding color filter of primary color filter lattice 280. The numeral 338 denotes electrochromic domains which contain ions which generate the indicated primary colors, as previously described. The changes in the filters necessary for the absorption mode entailing cyan, magenta, and yellow primary subtractive colors are obvious. Instead of a red, green and blue gravure lattice filter array, one may now have a cyan, magenta and yellow gravure lattice. Similarly, instead of a mirror or white surface at the ends of the conductors 340, there may be a black absorbing coating.

Figure 45:
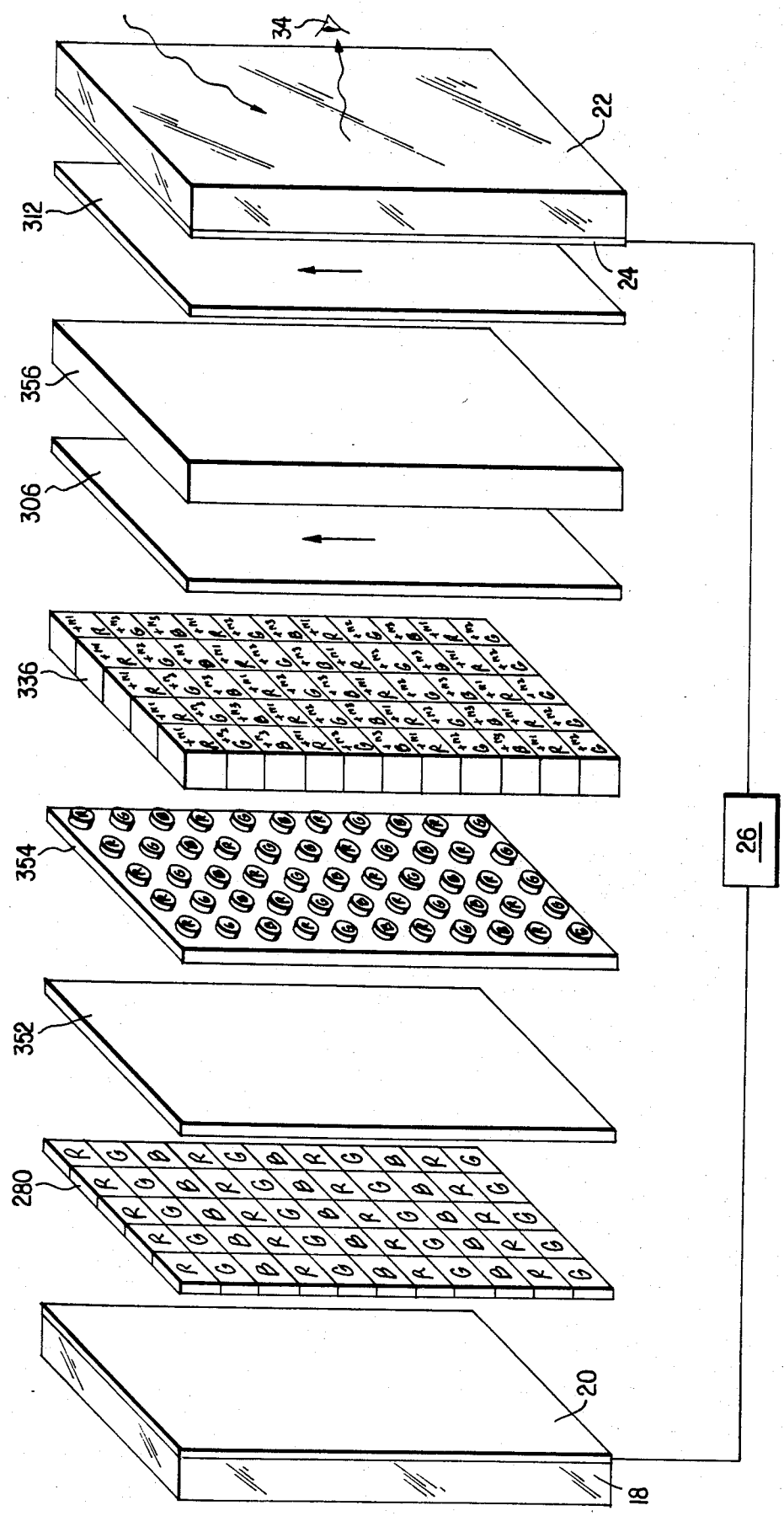

Referring now to FIG. 45, a construction is set out which employs twisted nemautic liquid crystal elements in a light amplifier for color. The numeral 280 denotes a primary color gravure lattice of the type previously described while the numeral 352 denotes a photoconductive sheet of the type previously described, namely, one whose electrical resistivity thereacross markedly decreases when subjected to light. The numeral 354 denotes a plate containing electrically conducting rods having their ends colored with three primary colors, as indicated, the rods being optically aligned with corresponding filter elements in sheet 280. The numeral 336 is similar to that described with respect to embodiment FIG. 42 and again represents an electrochromic gravure lattice having the indicated color generating properties on the several plugs or domains thereof. Each domain is optically aligned with a corresponding element of aligned 354 and 280. The numeral 306 denotes a vertical polarizer which polarizes light passing therethrough in a vertical direction, while numeral 312 indicates an identical vertical polarizing sheet. Numeral 356 denotes a 90° twisted nematic liquid crystal. The twisted nematic crystal 356 has the property that the axis of plane polarized light incident thereon is rotated by 90°. Such light is hence absorbed by the second polarizer 306 in the absence of an electric field. When an electric field is applied to element 356, the axis of polarization is not twisted and thus light now passes through the second polarizer 306 onto the primary color filter 336 positioned in front of the mirror surfaces of cylindrical conductors of plate 354. In operation ambient light is selectively reflected back through the system to the observer 34 depending upon (as previously described) which color filters of plate 280 have passed light from an object.

Figure 46:
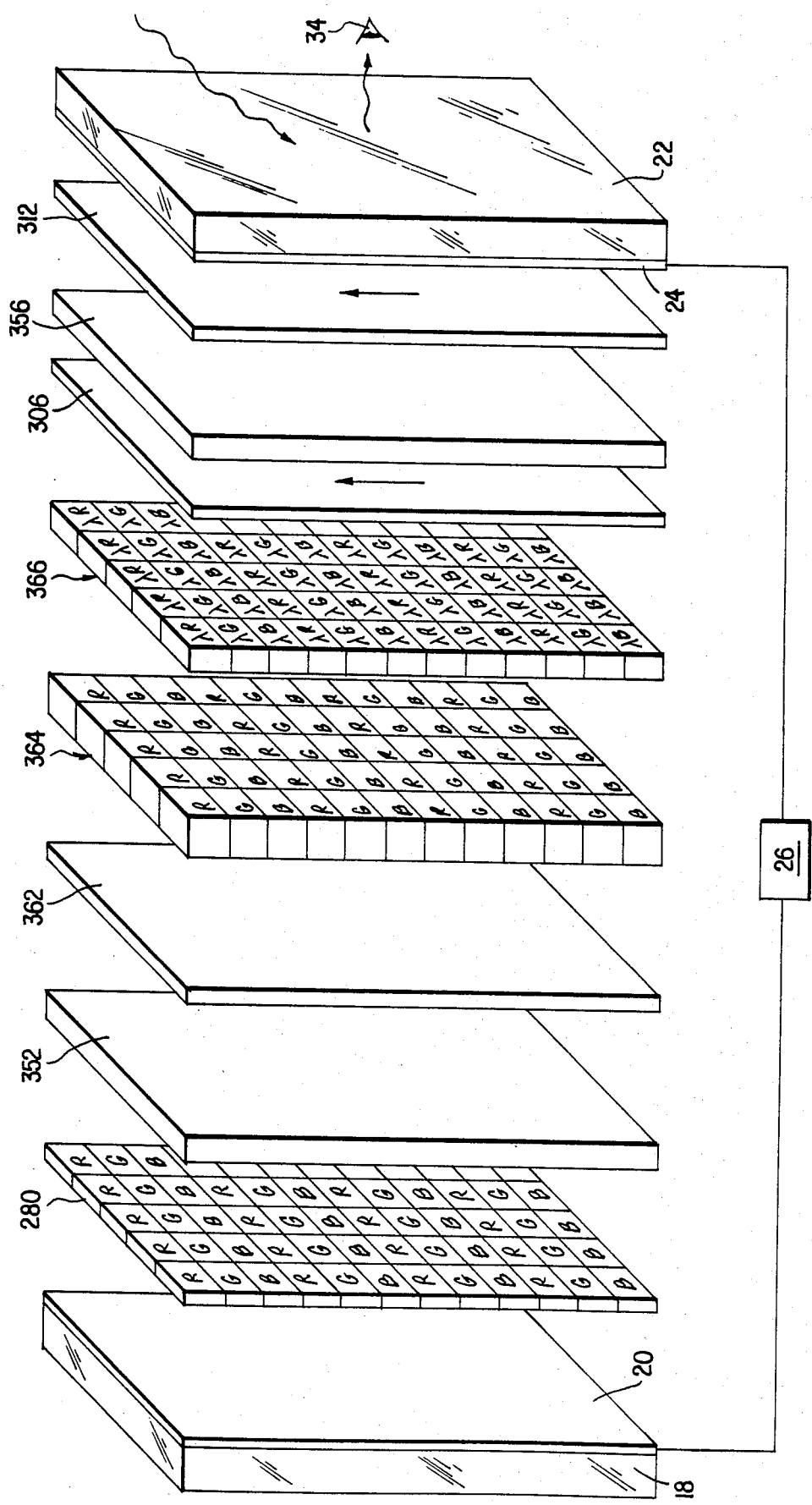
FIG. 46 is a partially schematic perspective view of another embodiment of a colored light amplifier and includes a quarter-wave plate.

Referring now to FIG. 46 of the drawings, a more complex liquid crystal light amplifier for color is illustrated. It functions in essence as a solid state panel because the gravure electro-optic cells are bounded by solid anti-diffusion and anti-lateral motion elements. The numeral 280 denotes a gravure lattice of primary colors while the numeral 352 denotes a photoconductor whose electric resistance markedly decreases when subject to light. Numeral 362 indicates an opaque dielectric sheet, while numeral 364 indicates a cholesteric gravure lattice of the left handed type having individual domains for the colors red, green, and blue, as indicated. Numeral 366 indicates a chromatic quarter wave plate in a gravure lattice array having the indicated color matching birefringent elements. As in the previously described embodiments, numerals 306 and 312 represent light polarizers which polarize light incident thereon in the indicated vertical direction, while numeral 356 again represents a nematic, 90°-twisted-liquid-crystal element. The operation of the device shown at FIG. 46 is as follows. Whenever there is an increase in the electric field across them, elements of the quarter-wave plate 366 convert ambient light into left-hand circularly polarized light.

Ambient light passes through polarizer 312 and is rotated 90° by twisted nematic plate 356. It is thus absorbed by polarizer 306 in the OFF position, i.e., low electric fields. In the ON condition, corresponding to high electric fields (from the action of filter plate 280 and photoconductor 352, as previously described) the light passes through polarizer 306 and onto quarter-wave plate 366. Light exiting therefrom is now incident on cholesteric gravure lattice 364. The light is now reflected back to the observer.

The thickness $t_r$, $t_b$, and $t_g$ of each gravure domain of lattice 364 must be such that, e.g., for additive color process;

$$t_r = \frac{(2m-1)}{n_o(r) - n_e(r)} \frac{\lambda_r}{4} \quad m = 1,2,3...$$

$$t_b = \frac{(2m-1)}{n_o(b) - n_e(b)} \frac{\lambda_r}{4} \quad m = 1,2,3...$$

$$t_g = \frac{(2m-1)}{n_o(g) - n_e(g)} \frac{\lambda_r}{4} \quad m = 1,2,3...$$

If the gravure 364 is everywhere of the same thickness t, then three different (color) birefringent materials must be chosen such that $$t = \frac{(2m-1)}{n_o(r) - n_e(r)} \frac{\lambda_r}{4} = \frac{(2m-1)}{n_o(b) - n_e(b)} \frac{\lambda_b}{4} = \frac{(2m-1)}{n_o(g) - n_e(g)} \frac{\lambda_g}{4}$$

The quantities $n_e$ and $n_o$ are the extraordinary and ordinary refractive indices of the birefringent material (assuming uniaxial material).

The three cholesteric liquid crystals are chosen such that $\Delta\lambda_r = n_e(r) - n_o(r)p_r$
$\Delta\lambda_g = n_e(g) - n_o(g)p_g$
$\Delta\lambda_b = n_e(b) - n_o(b)p_b$ where $p_r$ is the pitch of the "red" left-handed cholesteric liquid crystal, $p_g$ the pitch of the "green" left-handed cholesteric liquid crystal and $p_b$ that of the "blue", then, the left-handed red light will be reflected by the "red" cholesteric liquid crystal, the blue light by the "blue", etc. The cholesteric domains of plate 364 must be in color registry with the gravure color lattice elements of 280 on the weak (object) light side. All the wavelengths outside of $\Delta\lambda_r$ will pass through the cholesteric red domains and are absorbed by the absorber.

Figure 47:
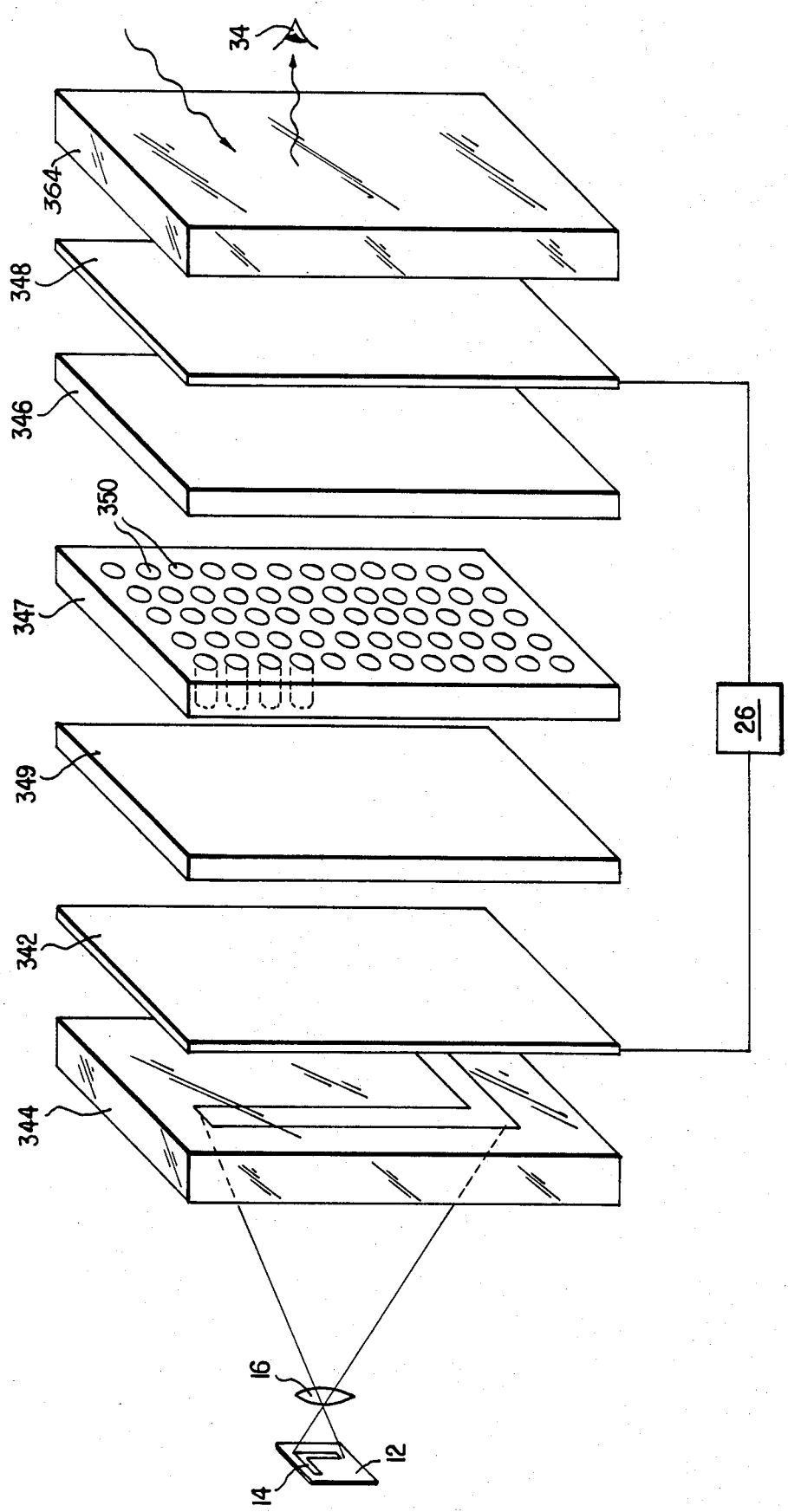
FIG. 47 is a partially schematic perspective view of a light amplifier of the gravure type of this invention which employs an elastomer.

Referring now to FIG. 47 of the drawings, another modification of a light amplifier is illustrated. This modification differs from the previous embodiments in that it employs an elastomer and depneds for its action upon the fact that in certain configurations an elastomer will undergo a strain upon the application of an electric field therethrough. The strain is a wrinkling type of deformation which occurs at a particular interface. In FIG. 47, the numeral 364 denotes a block or sheet of a transparent conductive elastomer which is electrically coupled by unidirectional source of potential 26 to sheet 342, the latter formed of a transparent and conductive material. The numeral 344 denotes a glass or plastic sheet. The numeral 346 denotes a sheet or blcok of an opaque, insulating elastomer. The numeral 348 denotes a light reflector and may assume the form of a coating such as evaporated island-structured indium.

The operation of the elements thus far described is similar to that set out in a literature publication entitled "Elastomer Display Devices" by Asano at pages 189, 190 of Proceedings of the IEEE, January, 1976, hereby incorporated by reference. Briefly, the mode of operation of the elements thus far described is as follows. When an electric field generated by source 26 is placed across the interface between the conductive elastomer 364 and the insulating elastomer 346, assuming it to be sufficiently thin, will also become deformed. If the ambient light striking mirror 348 is non-uniform over its area, then the interface between elastomers 364 and 346 will become wrinkled only at localized regions thereover. As set out in the noted report by Asano, such behavior is useful as a display device.

The display device illustrated at FIG. 47, (substantially the same as that illustrated at FIG. 1 of the noted Asano disclosure) is modified according to the practice of this invention so as to include a gravure lattice array 347 (to thereby reduce power requirements and increase optical resolution) as well as photoconductor 349. In this manner, instead of the entire area of the interface between elastomer elements 364 and 346 undergoing wrinkling deformation, only the area corresponding to the areas of metallic studs 350 will undergo such wrinkling deformation, by virtue of the lattice array 347 which is similar to element 40. This clearly represents a diminution in power requirements. From a consideration of FIG. 47, it will be apparent that the gravure points 350 may be instead defined by corresponding gravure domains of insulating elastomer 346. Clearly, the gravure lattice points may be positioned at several regions across the solid state laminate, as for example, at the photoconductor 349, the mirror 348, conducting elastomer 364, conducting surface 342.

What is claimed is:

1. A light amplifier display employing ambient light of the type including a pair of transparent sheet conductors, one each at the input and the output sides of the amplifier, means establishing an electrical field between them, a photoconductive medium and an electro-optic medium both being sandwiched by the transparent sheet conductors, the improvement comprising, means within said amplifier display for defining a gravure lattice array of points as viewed by the receiver of the display of said electro-optic medium, so that an image defined by the electro-optic medium will consist of gravure points instead of being continuous over its surface, said means positioned between said transparent conductors.

2. The light amplifier of claim 1 wherein said means for defining a gravure lattice array of points is defined by a dielectric plate which carries a lattice array of conductors over its surface, said dielectric plate and conductor array positioned between the photoconductor and the electro-optic medium.

3. The light amplifier of claim 2 wherein those ends of said conductors which face the electro-optic material are mirrors.

4. The light amplifier of claim 2 wherein those ends of said conductors which face the electro-optic medium project beyond the dielectric plate.

5. The light amplifier of claim 2 wherein those ends of said conductors of said lattice array of conductors are each in contact with a corresponding, single discrete volume of electro-optic material.

6. The light amplifier of claim 2 wherein the photoconductive medium is an array of discrete photoconductive elements, each of which is adjacent and optically aligned with a corresponding, single conductor.

7. The light amplifier of claim 6 wherein the electro-optic medium is in the form of discrete, individual volumes, each such volume being adjacent to and optically aligned with a corresponding discrete photoconductive element.

8. The light amplifier of claim 1 wherein said means is defined by a gravure lattice array of discrete volumes of the electro-optic medium.

9. The light amplifier of claim 1 wherein said means for defining a gravure lattice array is defined by the photoconductive medium constituting an array of discrete photoconductive elements.

10. The light amplifier of claim 9 wherein the electro-optic medium is in the form of discrete, individual volumes, each volume adjacent to and optically aligned with a corresponding one of said discrete photoconductive elements.

11. The light amplifier of claim 1 including an optical lens in alignment with each point of said gravure lattice.

12. The light amplifier of claim 1 wherein said means is defined by discrete conductive elements which are transparent and which are positioned on one side of that transparent sheet conductor which is positioned next to the electro-optic medium.

13. The light amplifier of claim 1 wherein said means is defined by a hollow and transparent vessel having an array of hollow projections extending out from one side thereof, said vessel filled with said electro-optic material.

14. The light amplifier of claim 1 wherein said means is defined by discrete conductive elements which are transparent and which are positioned on one side of that transparent sheet conductor which is positioned next to said photoconductive medium.

15. A light amplifier display employing ambient light and including a pair of transparent sheets, one each at the input and the output sides of the amplifier, the improvement comprising, a plurality of layer sets in series with each other and positioned between the transparent sheets, each set including a transparent, conductive layer, next to a photoconductor layer whose resistance changes only when subject to light of one color, next to a dichroic mirror layer which reflects light of said one color only, next to an electro-optic medium layer whose color changes from absorptive to light of said one color to clear upon an increase of electric field thereacross, each of said sets being for a different said one color, whereby colored light from an object is amplified.

16. The amplifier of claim 15 wherein at least one of said layers constitutes a gravure lattice array.

17. A light amplifier display employing ambient light and including a pair of transparent sheets, one each at the input and the output sides of the amplifier, the improvement comprising, a plurality of layer sets in series with each other and positioned between the transparent sheets, each set including a transparent, conductive layer, next to a photoconductor layer whose resistance changes only when subjected to light of one color, next to an electro-optic medium layer whose color changes from the complementary color of said one color to said one color upon an increase of electric field thereacross, each of said sets being for a different said one color, whereby colored light from an object is amplified.

18. A light amplifier for colored light of the type having a pair of transparent sheet conductors, one each at the input and the output sides of the amplifier, means for establishing an electric field between them, an electro-optic medium and a photoconductor between the sheet conductors, the improvement comprising, a sheet lattice array of primary color filters sandwiched by the input transparent conductor and the photoconductor, a gravure lattice array of conductors sandwiched by the photoconductor and the electro-optic medium, and a second primary color gravure lattice array, optically aligned with said first primary color array, whereby ambient light from the output side is selectively reflected to form an image.

19. The light amplifier of claim 18 wherein said second primary color lattice is defined by a color filter sheet sandwiched between the electro-optic medium and the output transparent sheet conductor.

20. The light amplifier of claim 18 wherein said second primary color lattice is defind by colored output side ends of the conductors of said gravure lattice array of conductors.

21. A light amplifier for colored light of the type having a pair of transparent sheet conductors, one each at the input and the output sides of the amplifier, means for establishing an electric field between them, and an electro-optic medium and a photoconductor between the sheet conductors, the improvement comprising, a sheet lattice array of primary color filters sandwiched by the input transparent conductor and the photoconductor, a second primary color gravure lattice array optically aligned with said first primary color array, whereby ambient light from the output side is selectively reflected to form an image.

22. The light amplifier of claim 21 wherein said second primary color gravure lattice is in the form of colored reflecting surfaces on the output side ends of a gravure array of conductor rods, the conductor rods positioned between the photoconductor and the electro-optic medium.

23. The light amplifier of claim 22 wherein the electro-optic medium is in the form of a gravure lattice of electro-optic domains of nematic liquid crystals, the domains being sandwiched by light polarizers whose planes of polarization are coincident.

24. The light amplifier of claim 21 wherein said second primary color gravure lattice is in the form of a sheet positioned between the electro-optic medium and the output transparent sheet conductor, and including an opaque dielectric sheet between the photoconductor sheet and the electro-optic medium.

25. The light amplifier of claim 21 wherein said second color gravure lattice is defined by electrochromic ion domains.

26. The light amplifier of claim 21 wherein said photoconductor is in the form of a gravure lattice array of photoconductors.

27. The light amplifier of claim 26 wherein said second primary color gravure lattice is in the form of colored reflecting surfaces on the output side ends of a gravure array of conductor rods, the conductor rods positioned between the photoconductor and the electro-optic medium.

28. The light amplifier of claim 27 wherein the electro-optic medium is in the form of a gravure lattice of electro-optic domains of nematic liquid crystals, the domains being sandwiched by light polarizers whose planes of polarization are coincident.

29. The light amplifier of claim 27 wherein said second primary color gravure lattice is in the form of a sheet positioned between the electro-optic medium and the output transparent sheet conductor, and including an opaque dielectric sheet between the photoconductor sheet and the electro-optic medium.

30. The light amplifier of claim 27 wherein said second color gravure lattice is defined by electrochromic ion domains.

31. A light amplifier for colored light of the type having a pair of transparent sheet conductors, one each at the input and the output sides of the amplifier, means for establishing an electric field between them, an electro-optic medium and a photoconductor between the sheet conductors, the improvement comprising, the photoconductor being in the form of a gravure lattice array of photoconductor domains responsive to different colors, the electro-optic medium being in the form of a gravure lattice of different color electrochromic ion domains.

32. The light amplifier of claim 31 including a gravure lattice array of color filters and a gravure lattice array of conductors mirrored on their ends facing the output transparent conductor sheet and next to the gravure lattice array of color filters, the mirrored conductors having their input ends facing and next to the photoconductor.

33. A light amplifier for colored light of the type having a pair of transparent sheet conductors, one each at the input and the output sides of the amplifier, means for establishing an electric field between them, the improvement comprising, a gravure lattice array of electrochromic ion domains of different colors positioned next to the input transparent sheet conductor, a gravure lattice array of conductors mirrored at their output ends, said photoconductors and said electrochromic ion domains being aligned and supported in a dielectric supporting panel, a gravure array of photoconductors each of which is aligned with a single, different one of said conductors having mirrored ends, a gravure lattice array of primary color filters each of which is aligned with a single, different one of said photoconductors.

34. A light amplifier for colored light of the type having a pair of transparent sheet conductors, one each at the input and the output sides of the amplifier, means for establishing an electric field between them, the improvements comprising, a gravure lattice array of primary color filters next to the inputsheet conductor, a photoconductive sheet next to the said primary color filter lattice, an opaque dielectric sheet next to said photoconductive sheet, a gravure lattice array of cholesteric domains each of which is sensitive to a single one of several colors, a gravure lattice array of one quarter-wave plates for different colors next to the cholesteric plate, and means for converting ambient light from the output end of said amplifier into plain polarized light.

* * * * *